(12) United States Patent
Baughman et al.

(10) Patent No.: US 11,151,492 B2
(45) Date of Patent: Oct. 19, 2021

(54) MULTIPLE POINT OF SALE (POS) OVERALL WAIT TIME OPTIMIZATION

(71) Applicant: International Business Machines Corporation, Armonk, NY (US)

(72) Inventors: Aaron K. Baughman, Cary, NC (US); Christian Eggenberger, Wil (CH); Alexander Schmid, Harburg (DE); Debra Scott, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/585,245

(22) Filed: Sep. 27, 2019

(65) Prior Publication Data
US 2021/0097461 A1    Apr. 1, 2021

(51) Int. Cl.
| | | |
|---|---|---|
| *G06Q 10/00* | (2012.01) | |
| *G06Q 10/06* | (2012.01) | |
| *G06K 9/00* | (2006.01) | |
| *G06Q 20/20* | (2012.01) | |
| *G06Q 30/02* | (2012.01) | |

(52) U.S. Cl.
CPC ... *G06Q 10/06312* (2013.01); *G06K 9/00302* (2013.01); *G06Q 20/202* (2013.01); *G06Q 30/0281* (2013.01)

(58) Field of Classification Search
None
See application file for complete search history.

(56) References Cited

U.S. PATENT DOCUMENTS

| | | | | |
|---|---|---|---|---|
| 4,675,647 A | * | 6/1987 | Salin | G07B 5/00 340/286.06 |
| 5,390,107 A | * | 2/1995 | Nelson | G06Q 10/06311 705/7.13 |
| 5,557,513 A | * | 9/1996 | Frey | G06Q 10/0631 705/7.12 |
| 6,059,184 A | * | 5/2000 | Ahlstrom | G06Q 10/02 235/375 |
| 6,377,935 B1 | * | 4/2002 | Deaton | G06Q 20/387 705/14.41 |

(Continued)

OTHER PUBLICATIONS

Alex Leykin and Mihran Tuceryan et al. (Detecting Shopper Groups in Video Sequences, 2007 IEEE) (Year: 2007).*

(Continued)

*Primary Examiner* — Hafiz A Kassim
(74) *Attorney, Agent, or Firm* — Christopher M. Pignato

(57) ABSTRACT

Multiple POS checkout system efficiency factors, based in part upon actual contents of shopping containers and time sequences of images of facial expressions of individual shoppers, are iteratively calculated using computer-based analytics responsive to randomized individual shopper arrivals at a set of point of sale (POS) checkout systems within a store. At least one of a change to a different queue or a change to a different position within a queue of at least one shopping container associated with an individual shopper is identified that results in a more consistent distribution of the calculated multiple POS checkout system efficiency factors across the set of POS checkout systems. At least one shopping container is directed to the different queue or the different position within the queue to improve overall POS checkout system efficiency across the set of POS checkout systems.

18 Claims, 8 Drawing Sheets

FIG. 7

(56) References Cited

U.S. PATENT DOCUMENTS

| | | | | |
|---|---|---|---|---|
| 6,847,393 B2* | 1/2005 | Ashe | | G07G 1/14 |
| | | | | 348/143 |
| 7,346,589 B1* | 3/2008 | Camden | | G06Q 30/00 |
| | | | | 705/37 |
| 8,135,612 B1 | 3/2012 | Scudder | | |
| 8,615,420 B2 | 12/2013 | Holliday | | |
| 10,713,670 B1* | 7/2020 | Moon | | G06Q 30/0201 |
| 2003/0102373 A1* | 6/2003 | Swartz | | G07G 3/003 |
| | | | | 235/383 |
| 2003/0124493 A1* | 7/2003 | Kulack | | G09B 19/00 |
| | | | | 434/118 |
| 2004/0059614 A1* | 3/2004 | Brown | | G06Q 30/0281 |
| | | | | 705/346 |
| 2004/0140352 A1* | 7/2004 | Walker | | G06Q 30/0224 |
| | | | | 235/383 |
| 2004/0181424 A1 | 9/2004 | Hale et al. | | |
| 2007/0100677 A1* | 5/2007 | Boss | | G06Q 10/06311 |
| | | | | 705/7.13 |
| 2008/0046304 A1* | 2/2008 | Dean | | G06Q 10/0633 |
| | | | | 705/7.25 |
| 2008/0059274 A1* | 3/2008 | Holliday | | G06Q 10/0639 |
| | | | | 705/7.31 |
| 2010/0106652 A1* | 4/2010 | Sandholm | | G06Q 30/0202 |
| | | | | 705/80 |
| 2010/0250381 A1* | 9/2010 | Snyder | | G08B 5/36 |
| | | | | 705/21 |
| 2011/0231419 A1* | 9/2011 | Papke | | G06F 16/784 |
| | | | | 707/756 |
| 2012/0078673 A1* | 3/2012 | Koke | | G06Q 10/087 |
| | | | | 705/7.13 |
| 2013/0027561 A1* | 1/2013 | Lee | | G06K 9/00302 |
| | | | | 348/150 |
| 2013/0085879 A1* | 4/2013 | Edwards | | G06Q 30/06 |
| | | | | 705/23 |
| 2013/0103486 A1 | 4/2013 | Hess et al. | | |
| 2013/0117695 A1* | 5/2013 | Hammoud | | G06Q 50/10 |
| | | | | 715/761 |
| 2014/0052554 A1* | 2/2014 | Abraham | | G06Q 20/208 |
| | | | | 705/21 |
| 2014/0063236 A1* | 3/2014 | Shreve | | G06K 9/00228 |
| | | | | 348/143 |
| 2014/0229224 A1 | 8/2014 | Appel et al. | | |
| 2014/0236653 A1* | 8/2014 | Farrell | | G07G 1/0036 |
| | | | | 705/7.15 |
| 2014/0244207 A1* | 8/2014 | Hicks | | G01C 3/00 |
| | | | | 702/150 |
| 2014/0267738 A1* | 9/2014 | Allen | | H04N 7/188 |
| | | | | 348/156 |
| 2016/0148238 A1* | 5/2016 | He | | G06Q 30/0224 |
| | | | | 705/14.1 |
| 2017/0053326 A1* | 2/2017 | SivasankaranNair | | |
| | | | | G07G 1/0081 |
| 2017/0323376 A1 | 11/2017 | Glaser et al. | | |
| 2019/0095933 A1 | 3/2019 | Doherty | | |

OTHER PUBLICATIONS

Gregory E. Opara-Nadi et al. (Electronic Self-Checkout System Versus Cashier Operated System: a Performance Based Comparative Analysis, May 2005) (Year: 2005).*

Author Unknown, Introducing Amazon Go and the world's most advance shopping technology, video, Dec. 5, 2016, pp. 1-2, Amazon.com, Inc., Published at: www.youtube.com/watch?v=NrmMk1Myrxc.

Adam Dachis, Why Express Checkout Lanes Are a Waste of Time, Jan. 2, 2013, pp. 1-6, Lifehacker.com, Published at: www.lifehacker.com/5972618/why-express-checkout-lanes-are-a-waste-of-time.

Agata Kolakowska, et al., Emotion Recognition and its Application in Software Engineering, In Proceedings of the 6th International Conference on Human System Interaction, Jun. 6, 2013, pp. 1-8, IEEE Xplore Digital Library, Gdansk, Poland.

Micha Pratt, The Pros and Cons of Using Self-Checkouts, Aug. 7, 2013, pp. 1-8, Business.org, Published at: www.business.org/software/point-of-sale/the-pros-and-cons-of-using-self-checkouts.

Katie Robertson, Why Can't Americans Ditch Checks?, Jul. 26, 2017, p. 1, Bloomberg.com News, Published at : www.bloomberg.com/news/articles/2017-07-26/why-can-t-americans-give-up-paper-checks.

Author Unknown, Take a Number Systems, Printed from website on Sep. 17, 2019, pp. 1-3, Take A Number Systems, Published at: www.takeanumbersystems.com.

* cited by examiner

600

┌─ 602
│ CALCULATE ITERATIVELY, USING COMPUTER-BASED ANALYTICS RESPONSIVE TO RANDOMIZED INDIVIDUAL SHOPPER ARRIVALS AT A SET OF POINT OF SALE (POS) CHECKOUT SYSTEMS WITHIN A STORE, MULTIPLE POS CHECKOUT SYSTEM EFFICIENCY FACTORS BASED UPON: (I) ACTUAL CONTENTS OF SHOPPING CONTAINERS ASSOCIATED WITH INDIVIDUAL SHOPPERS DETERMINED FROM A SET OF ITEM IDENTIFICATION SENSORS, (II) DIFFICULTY FACTORS THAT IDENTIFY DIFFICULTY OF CHECKOUT OF THE ACTUAL CONTENTS OF THE SHOPPING CONTAINERS, (III) TIME CONSTRAINTS OF THE INDIVIDUAL SHOPPERS, (IV) TIME SEQUENCES OF IMAGES OF FACIAL EXPRESSIONS OF THE INDIVIDUAL SHOPPERS AS THE INDIVIDUAL SHOPPERS APPROACH AND WAIT IN DIFFERENT QUEUES IN FRONT OF THE SET OF POS CHECKOUT SYSTEMS, (V) TRADEOFF POINTS OF THE INDIVIDUAL SHOPPERS, (VI) PERFORMANCE OF MULTIPLE CHECKOUT CASHIERS COLLECTIVELY WORKING THE SET OF POS CHECKOUT SYSTEMS AS THE PERFORMANCE VARIES INDIVIDUALLY AMONG THE MULTIPLE CHECKOUT CASHIERS DURING A WORK SHIFT, (VII) A PAYMENT TYPE INDICATED BY THE INDIVIDUAL SHOPPERS, AND (VII) LENGTH OF THE QUEUES IN FRONT OF THE SET OF POS CHECKOUT SYSTEMS

┌─ 604
│ IDENTIFY AT LEAST ONE OF A CHANGE TO A DIFFERENT QUEUE OR A CHANGE TO A DIFFERENT POSITION WITHIN A QUEUE OF AT LEAST ONE SHOPPING CONTAINER ASSOCIATED WITH AN INDIVIDUAL SHOPPER THAT RESULTS IN A MORE CONSISTENT DISTRIBUTION OF THE CALCULATED MULTIPLE POS CHECKOUT SYSTEM EFFICIENCY FACTORS ACROSS THE SET OF POS CHECKOUT SYSTEMS

┌─ 606
│ DIRECT THE AT LEAST ONE SHOPPING CONTAINER TO THE DIFFERENT QUEUE OR THE DIFFERENT POSITION WITHIN THE QUEUE TO IMPROVE OVERALL POS CHECKOUT SYSTEM EFFICIENCY ACROSS THE SET OF POS CHECKOUT SYSTEMS

FIG. 6

MULTIPLE POINT OF SALE (POS) OVERALL WAIT TIME OPTIMIZATION

BACKGROUND

The present invention relates to in-store point of sale (POS) efficiency management. More particularly, the present invention relates to multiple point of sale (POS) overall wait time optimization.

Retail establishments utilize point of sale (POS) systems to scan and weigh items being purchased by shoppers, and to receive payment from the shoppers for their respective purchases. Point of sale (POS) systems are usually located within designated areas of retail establishments to channel all purchase activities through those defined areas of the retail establishments.

SUMMARY

A computer-implemented method includes calculating iteratively, using computer-based analytics responsive to randomized individual shopper arrivals at a set of point of sale (POS) checkout systems within a store, multiple POS checkout system efficiency factors based upon: (i) actual contents of shopping containers associated with individual shoppers determined from a set of item identification sensors, (ii) difficulty factors that identify difficulty of checkout of the actual contents of the shopping containers, (iii) time constraints of the individual shoppers, (iv) time sequences of images of facial expressions of the individual shoppers as the individual shoppers approach and wait in different queues in front of the set of POS checkout systems, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of the queues in front of the set of POS checkout systems; identifying at least one of a change to a different queue or a change to a different position within a queue of at least one shopping container associated with an individual shopper that results in a more consistent distribution of the calculated multiple POS checkout system efficiency factors across the set of POS checkout systems; and directing the at least one shopping container to the different queue or the different position within the queue to improve overall POS checkout system efficiency across the set of POS checkout systems.

A system that performs the computer-implemented method and a computer program product that causes a computer to perform the computer-implemented method are also described.

BRIEF DESCRIPTION OF THE DRAWINGS

FIG. 6 is a flow chart of an example of an implementation of a process for multiple point of sale (POS) overall wait time optimization according to an embodiment of the present subject matter.

DETAILED DESCRIPTION

Figure 1:
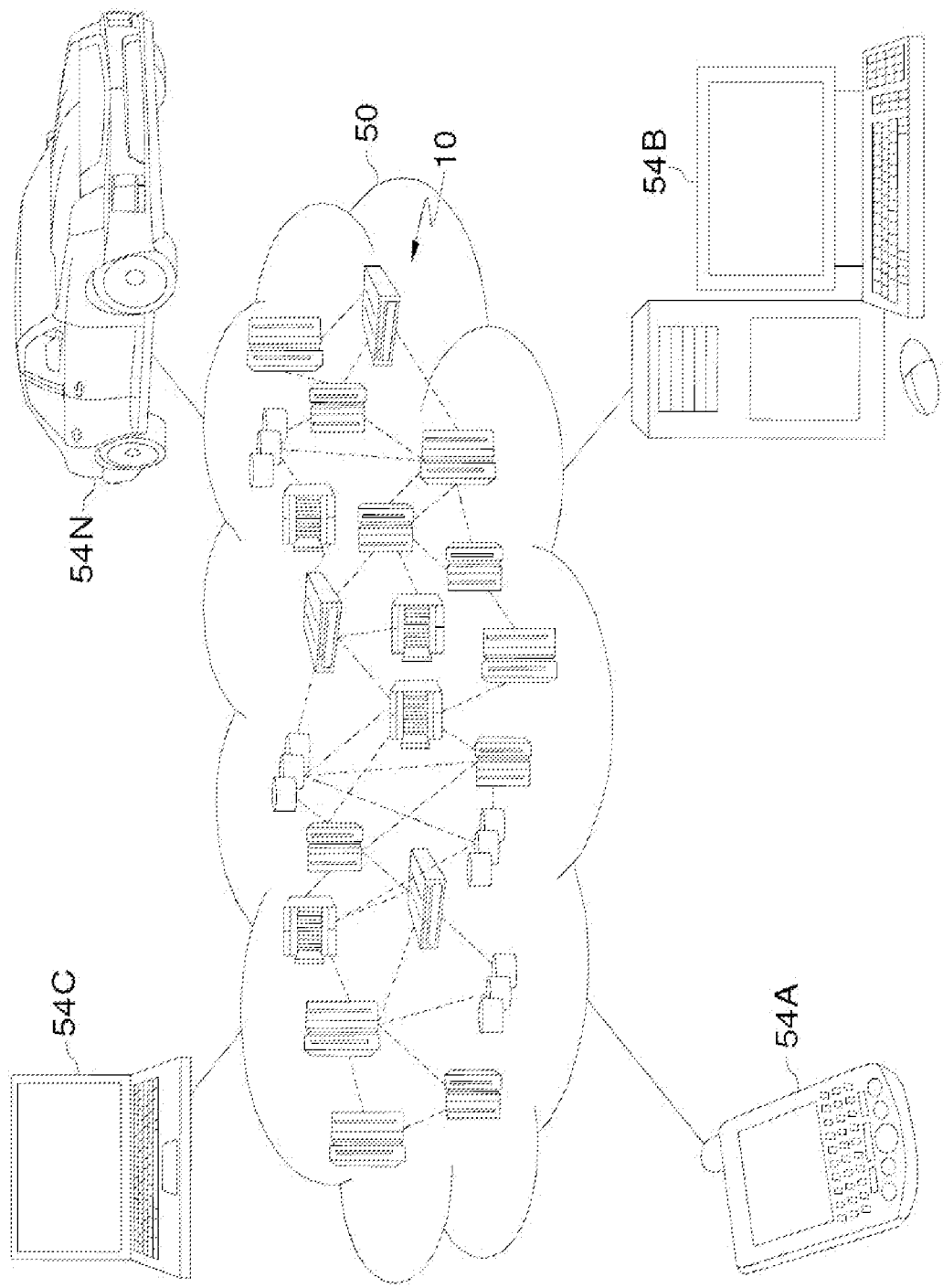
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides multiple point of sale (POS) overall wait time optimization. The present technology solves a recognized POS checkout system efficiency problem and a resulting inefficient shopper wait-time problem by providing technology that includes a new form of computational processing by an integrated set of computing and sensor/sensing devices. The technology described herein improves the integrated efficiency of multiple POS checkout systems within retail establishments and, thus, improves several aspects of a shopper's shopping experience.

The technology described herein operates by calculating iteratively, using computer-based analytics responsive to randomized individual shopper arrivals at a set of point of sale (POS) checkout systems within a store, multiple POS checkout system efficiency factors. The multiple POS checkout system efficiency factors include: (i) actual contents of shopping containers associated with individual shoppers determined from a set of item identification sensors, (ii) difficulty factors that identify difficulty of checkout of the actual contents of the shopping containers, (iii) time constraints of the individual shoppers, (iv) time sequences of images of facial expressions of the individual shoppers as the individual shoppers approach and wait in different queues in front of the set of POS checkout systems, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of the queues in front of the set of POS checkout systems. At least one of a change to a different queue or a change to a different position within a queue of at least one shopping container associated with an individual shopper is identified that results in a more consistent distribution of the calculated multiple POS checkout system efficiency factors across the set of POS checkout systems. At least one shopping container is directed to the different queue or the different position within the queue to improve overall POS checkout system efficiency across the set of POS checkout systems.

As described in more detail and expanded upon further below, the technology described herein performs two primary categories of processing. The technology determines the usability of checkout systems based on the evaluation of shopper experience information across many shoppers, including shopper facial expressions, gestures, and other indicia of the shoppers using the checkout system to check out. Additionally, the technology described herein predicts checkout counter scanning times by accurately tracking the addition of items to shopping containers (alternatively "baskets" or "carts" for ease of reference hereinafter) by shoppers. It is understood that the term shopping container additionally includes shopping bags, hats, box lids, or any other type of structure usable to contain items while shopping.

Regarding evaluation of shopper experience information across many shoppers, the technology described herein utilizes sequential video frames captured using one or more cameras to measure changes in facial expression, body position, gestures, and skin luminescence as the individual shoppers approach and wait in the different queues in front of the set of POS checkout systems (alternatively referred to as "POS system" or "POS systems" herein). Changes in the states of the respective shoppers, both as they shop and as they approach and proceed through checkout, are continually evaluated to identify any change of facial expression, gesture, or skin luminescence of any individual shopper that indicates the shopper considers the POS checkout system efficiency across the set of POS checkout systems to be less than expected by the shopper. By use of this information, the automated checkout system management can ensure timely system responsiveness to those changes in states. Signal acquisition from video cameras is divided into three distinct stages. The first stage of signal acquisition is a "pre-checkout" period before a shopper arrives at a checkout area. The rate of change of a given shopper is measured against behaviors of other shoppers ahead of the given shopper in line. The second phase of signal acquisition is a "during-checkout" period and includes the time during the checkout process. The third phase of signal acquisition is a "post-checkout" period of time after the checkout process, during which the shopper signals continue to be acquired. The pre-checkout, during-checkout, and post-checkout phases are used as feedback to improve system performance and shopper routing to different POS queues by helping to shuffle queues for other shoppers that are in line. In addition, the pre-checkout signals are additionally used to either alter or maintain the checkout experience for other users, while the during-checkout signals help the system learn how to modify the checkout experience for similar shoppers. The post-checkout and during-checkout phases are also used to communicate checkout status to other shoppers in the same line of their respective time estimate(s) and to indicate to those other shoppers if they should move to a different line. For example, the post-checkout measurements of a shopper are cascaded to all shoppers in the line to compare how similar those shoppers are to the shopper that finished the checkout experience. The similarity measurements are used to estimate a checkout time for the following shoppers. As such, the technology described herein leverages social influence factors to monitor and regulate checkout efficiency and the checkout experience for shoppers.

It should be noted that, for purposes of the present technology, use of facial expressions and emotional determinations may be limited to public places where persons would not have an expectation of privacy, such as a publicly-accessible store or supermarket. Additionally, the technology described herein may implement additional protections for shoppers by providing advanced notice to shoppers entering a location being monitored. Shoppers may be provided with an ability to opt-in or opt-out of use of these features, and/or these features may be limited to shoppers that have signed up for use of these features to enhance their shopping experience. For example, shoppers may utilize their respective shopper profiles to opt-in or opt-out of use of these features. Alternatively, shoppers may utilize of an online application provided by the store to opt-in/opt-out. In such an implementation, the system may detect a shopper entering the store by having the shopper's phone that is loaded with the store's application communicate user profile information to the store system indicating that the shopper has opted in or opted out of use of these tracking features. Many other options for allowing shoppers to opt-in or opt-out of these features may be provided, and any and all such options are considered within the scope of the technology described herein.

Regarding prediction of checkout counter scanning times, various sensors and cameras installed within or outside of a shopping basket, throughout a store, and in a waiting room approximate what is in the shopping basket. Sensor input combined with artificial intelligence (e.g., picture recognition of the basket contents from various angles) is used to predict the checkout counter scanning time(s). To predict the scanning times, the technology described herein operates by determining both the number of items and what kind(s) of products are in a basket, in recognition that the item type and item count would indicate whether a cashier would need either more or less time to complete the checkout of a given basket. For example, items that are heavy or large may require a cashier to leave the register and take a few steps to scan the item. Some other items may require a warranty certificate to be issued or some other additional activity to be carried out. In addition to the weight sensor, other sensors such as cameras, barcode scanners, and thermistors are used to determine the products as accurately as possible in order to make a more precise estimate of the checkout counter scanning time(s).

Shopper positioning, mobility, and navigation sensors monitor shopper movements and pauses along the shopping routes. The shopper positioning, mobility, and navigation sensors are used to determine shopper location, age, movements, and pauses. The shopper age is utilized to determine types of items that appeal to and be selected by the different shoppers. The determined shopper locations, movements, and pauses are utilized to either exclude or include items that are located on shopping racks at different locations within a store. For example, items on racks are excluded from possible items in a basket if the customer either has not even passed by a given rack or has passed by a rack without pausing. Alternatively, items on racks at which the shopper has paused during a shopping experience are considered for possible items in a basket. From the latter inclusive set of possible items placed in a basket by a shopper, the respective other sensors are utilized to accurately identify the item(s) with a reasonably high probability or with precise accuracy, based upon the respective types of items. For any item for which a reasonably high probability is involved, additional sensing technologies are leveraged to perform a precise identification of the items and quantities.

Regarding item identification sensors, a variety of cameras, scanners, and image analysis systems (collectively "sensors" hereinafter) are utilized during a shopping trip to identify items as a shopper selects and places the items in a shopping container. It should be noted that many different and complementary types of sensors are utilized to accurately identify items within baskets. It is understood that the combination of sensors is selected as appropriate for the given implementation, and that it is by use of a combination of sensors and sensing technologies that the technology described herein achieves precise identification of the many different items within a basket and respective quantities of each of the different items. Several sensors are described below and are collectively usable to identify items. It is understood that an inventory management system is utilized in combination with the various sensors to track and confirm adjustments to inventory as shoppers select and place items within a basket.

Direct machine-readable types of sensors (e.g., barcode sensors, quick response (QR) coded sensors, radio frequency identification (RFID) sensors and other direct machine-readable types of sensors) provide a recognition probability of one hundred percent (100%), where the respective machine-readable representation of the item identification data exists, and is visible or readable by the respective sensor(s). Additionally, image recognition sensors provide a recognition probability between zero percent and one hundred percent (0% and 100%), depending upon whether (i) the item is part of a recent deep learning phase and (ii) how much of the product is visible in the basket. With similar recognition probabilities, text analysis sensors that analyze visible text (e.g., text fragments that describe the product, a price tag, a validity date, a brand logo, a campaign sticker) also assist with accurate identification of an item in a basket. Further, shape analysis sensors identify items shapes (e.g., round, spherical, angular) that also contribute to precise identification of the items and quantities. Size identification (e.g., height, depth, width) are also utilized in combination to assist with precise identification of the items and quantities.

Regarding identification of fresh food versus pre-packaged food, for fresh foods (e.g., vegetables, fruit, salads, etc.), customers may place the food items on a scale, and an image recognition system or food x-ray scanner may recognize whether the item is a fresh food item and whether the shopper is provided with a paper label to be attached to a container within which the food item is placed. In the event that a particular shopper is observed by the image recognition system to have failed to attach the paper label, a probability that the paper label was not affixed can be taken into account when calculating the expected checkout time as the cashier needs to re-weigh the item or manually look up the price.

An odor sensor is also used to detect aromas from fresh fruits and vegetables. For purposes of the technology described herein, any form of odor sensor may be utilized. For example, an odor sensor operates based upon analysis of chemical compositions of molecules of air to determine what chemical compounds are in the molecules. Pre-configured compound relationships are specified such that detection of a particular compound correlates with the presence of a particular fresh fruit or vegetable in proximity to the odor sensor. For example, a ripe cantaloupe and a banana are each distinguished and thereby recognized by an odor sensor. Similarly, regarding use of odor sensors to exclude categories of items, a bottle of soda would not typically generate a detectable odor. As such, where the weight of an item is detected by a weight sensor, and there is an absence of a detectable odor, then with reasonable certainty it is determined that the item is not a fresh fruit or a vegetable categorized and recognized to produce a detectable aroma. It is understood that certain fruits and vegetables may not produce detectable odors, and that other technologies (e.g., image recognition, etc.) as described herein are utilized to identify the respective items with reasonable certainty.

An item density reader is also utilized to help identify and distinguish different items within a basket. For example, organic materials (e.g., paper, food, etc.) may appear in a distinctive color (e.g., orange). In contrast, other materials such as metals and glass may appear in alternative distinctive colors (e.g., blue or green). Using this technology, the denser the material, the darker the color, resulting in information that is utilized to identify the item(s) in the basket.

Packaging material recognition and characteristics sensors are also utilized to help identify and distinguish different items within a basket. For example, reverberation, visible reflection (e.g., mirroring, including optical distortion), opaqueness, transparency, acoustic reflection (e.g., where glass has a different characteristic than a melon) are all utilized to help identify and distinguish different items within a basket. Further, different items may produce different sounds/acoustics (e.g., clinking glass bottles is distinguished from produce when placed in a basket). Permanently-installed acoustic detection platforms are utilized in a waiting room area, and are configured to lightly shake the basket to initiate acoustic signaling from the items in the basket. The shaking increases image recognition rate/confidence, and an acoustic detection device records and analyzes the resulting sounds.

Weight and weight change analysis sensors are utilized to help identify and distinguish different items within a basket. The accumulated weight of all items in the basket is leveraged as a checksum in combination with other item recognition technologies, or is utilized each time an item is placed within or removed from a basket.

Temperature measurement and thermal imaging sensors are also utilized to help identify and distinguish different items within a basket. For example, frozen products are sensed by temperature sensors or infrared imaging sensors located in a basket. Regarding infrared imaging sensors, frozen or refrigerated items produce a cooler thermal image (e.g., blue) relative to temperature readings and thermal images of hot items (e.g., red).

It should be noted that by use of the various sensors described herein, both alone and in combination as appropriate for a given implementation, scanning processing at checkout is accelerated. For example, where it is determined from the various sensors that multiple items of the same type are in the basket, whether arranged together or scattered amongst other items in the basket, the respective item counts and item checkout logistics are utilized to determine expected checkout times. The checkout sequence is optimized across the different POS systems based upon the respective shoppers' individual priorities and the expected checkout times of each basket. In order to optimize the checkout sequence, the expected checkout time for each cart or basket is considered as augmented by the determined quantity of the different items of the same type that are in each basket.

It should be noted that the technology described herein is utilized in any retail or wholesale environment. Examples of such environments include, among others, grocery stores, hardware stores, office supply stores, pet stores, restaurants/cafeterias that provide salad bars and other types of a la carte food selections, and any other type of environment that sells products that are selected and paid for on site by a consumer or reseller. These and other types of retail or wholesale environments are alternatively termed "stores" herein for ease of reference.

Additionally, the technology described herein is applied across multiple retail or wholesale environments by use of an intelligent distributed queue management system (IDQMS), as described in more detail below. The IDQMS modifies the chronological order of shoppers that have specified a time constraint for shopping, such that those shoppers with specified time constraints are served within or as close to their respectively specified timespans. The IDQMS analyzes a wide variety of data related to item identification and other forms of data that are captured and shared among a current store as well as different participating stores to continuously learn from the accumulated captured image and other sensor information. As such, the IDQMS continually learns and improves its own capabilities based upon applying the computer-implemented deep learning and analytics described herein.

The types of products that are processed as described herein include any product that is sold and purchased within any kind of store. Example product types that can be processed include fresh fruits and produce, salads, meals, canned and boxed food products, refrigerated and frozen food products, drinks, home supplies, pet supplies, office supplies, hardware supplies, and other types of products, as appropriate or a given implementation.

It should be noted that a grocery store is utilized herein for purposes of example because of the variety of different types of products that are purchased by a shopper (e.g., fresh fruits, frozen foods, salads, meals, boxed/canned foods, home supplies, pet supplies, etc.). However, it is understood that the examples and teachings herein can also be applied to any retail or wholesale environment, again as appropriate for a given implementation.

The technology described herein applies computer-driven analytics and computer-based deep-learning methods to process inputs derived from multiple forms of environment sensors to arrive at an optimal distribution of shoppers across a set of POS systems. The computer-driven analytics and computer-based deep-learning methods are applied continually during the operating hours of a store to continually refine and improve checkout line recommendations/suggestions to shoppers.

The technology described herein improves several different aspects of multiple POS system operations. Certain foundational operating principles include bringing lines of shoppers through a checkout as quickly as possible. The technology operates by knowing precisely not only what is in a shopping basket (e.g., numbers and types of items), but by additionally calculating how much time is needed to complete a checkout based upon a variety of contemporaneous inputs and factors by use of various types of sensors, and historical profiles of both shoppers and cashiers. The various types of sensors will be described in more detail further below.

It should additionally be noted that the technology described herein improves upon conventional technologies to create a more efficient and automated checkout experience by use of several different sensors that are capable of determining with greater accuracy contents of a given shopping basket. For example, conventional approaches to automated item identification cannot be utilized within certain areas of a grocery store because item identification and weight of fresh produce cannot be encoded with a barcode without damaging the produce itself (e.g., delicate fruits or vegetables, etc.). The technology described herein solves this problem and allows more accurate identification of both items themselves and quantities/weights of such items to allow a more efficient and automated checkout experience.

Additionally, and with the benefit of accurate item identification within shopping baskets, the technology described herein alternatively provides fully-automated shopping basket transportation through checkout lanes by use of an in-store shopping container navigation system. Where automated shopping basket transportation is provided in a store, shoppers can be associated with a shopping container during the shopping experience, shopper checkout preferences/constraints can be determined, and shoppers can completely omit navigating the checkout lines themselves. Shoppers then leave their shopping basket on an automated trolley system/conveyor of the in-store shopping container navigation system, and the baskets are routed and processed through checkout. Further, by balancing collected multiple POS checkout line efficiency factors as described herein, a change of a shopper's basket to a different queue or to a different position can be identified, and the shopping basket/container can be automatically navigated via the trolley system/conveyor to a different queue or different position within the queue. As such, by use of the in-store shopping container navigation system described herein, instead of waiting in line to checkout, shoppers can wait in a waiting room/area until their checkout is completed and the POS system is ready for payment (if payment has not already been established via pre-authorization). Within the waiting room/area, shoppers can socialize with friends, make new acquaintances, check email or text on their smartphone, or perform other tasks that add value to the shopping experience while the checkout process proceeds. For example, the shopper can configure an automated payment for the order that is being processed and/or can confirm payment authorization in response to presentation of a total amount for the purchase on their smart phone. The POS system can be configured to send the respective receipt or payment authorization to the shopper's smart phone. These forms of payment efficiency improvement can be configured by the shoppers within their respective shopper profiles to further improve the efficiency of their shopping experience. Additionally, where a payment type does not require the shopper to interact with the cashier (e.g., credit card, pre-authorization or payment confirmation by smart phone, or other form of electronic payment type), shoppers retrieve their purchased items from the trolley system/conveyor at or near the exit of the store, again as automatically routed to a particular location temporarily designated for the particular shopper to receive their purchased items. Alternatively, if the shopper is paying by check or cash, the shopper tenders payment to the cashier and efficiently exits with their purchased items.

As described in more detail below, based upon a complex set of information derived from computer-driven analytics and computer-based deep-learning, the technology described herein predicts checkout scanning time, as well as optimal handling priority and checkout ordering, to distribute different shoppers and scanned item types across multiple different POS systems over time. In addition, by distributing the different types of scanning responsibilities and different payment types across different POS systems over time, the technology described herein may improve workplace safety of use of the different POS systems over time by reducing fatigue of cashiers that operate the different POS systems, as described in more detail below.

As introduced above, the derived set of information includes checkout-time attributes of each different shopper that are based upon the different types/items in the respective shopper's basket. The checkout-time attributes predict time requirements for normal/typical checkout processing based upon the actual contents of baskets of the different shoppers. These checkout-time attributes may be determined either as items are placed within the basket by various basket sensors or by use of various in-store sensors and cameras that determine these attributes as the shopper moves through the store. As will be described in more detail below, the checkout-time attributes are augmented with and adjusted based upon attributes from other sensor inputs to more-accurately account for in-store changes that affect the actual time requirements.

For example, cashier efficiency fluctuations may occur as a cashier advances through a working shift, and a cashier may naturally either slow down or speed up their checkout processing at different times during a shift. Cashier fluctuations occur for a variety of reasons, including increasing concentration weakness of the cashier towards the end of a shift, different processing efforts depending on the payment method (e.g., cash, check, credit card, electronic payment, etc.), and/or additional efforts to process marketing campaigns for certain products or manufacturers (e.g., vouchers, receive and redeem loyalty vouchers, etc.). Cashier profiles can be created and monitored that include cashier efficiency attributes that document these natural processing time variations through a shift for different cashiers that are operating the different POS systems. The technology described herein further predicts real-time differences in efficiency of use of the different POS systems over time to dynamically adjust routing of shoppers and different types of scanned items to different cashiers/POS systems over time. By distributing the shoppers and the different types of scanned items to different cashiers/POS systems over time, cashier fatigue is reduced, POS system performance is improved, and workplace safety is further improved.

Additionally, cash drawers may need to be changed routinely to provide a balanced amount of cash from which to tender change to shoppers. Cash profiles can be created and monitored to include available cash attributes that document fluctuations of available cash for each POS system throughout shifts to initiate cash drawer exchanges at different intervals to assist with increased efficiency and decreased fatigue at POS stations.

Individual shopper profiles can be created by shoppers and utilized to specify time constraints for checkout. Alternatively, shoppers can specify a time constraint upon arrival to be met by the automated checkout prioritization system described herein.

Payment-type attributes can also be specified by shoppers in advance of attempting to checkout, either within an individual shopper profile, or on-site within the store at arrival or during a shopping event. Shoppers can specify any payment type usable to pay the particular store for their purchase(s). For example, cash, check credit card, and near field communication (NFC) payment types can be specified by shoppers and used to pay for purchases. It should be noted that NFC payment systems operate based upon proximity and wireless communications to achieve payment transactions on behalf of shoppers. An NFC payment terminal can be placed at a POS terminal, and a shopper may waive their NFC payment-enabled cell phone or card near the NFC payment terminal to complete a payment transaction. Many NFC payment options are offered by different companies, and again any such payment type usable at the particular store may be specified and used by shoppers. The payment type is factored into the calculation of checkout efficiency across the set of POS systems, and integrated as another attribute to dynamically adjust routing of shoppers to different POS systems. As noted above, by distributing the types of activities that cashiers are responsible for performing over time, workplace safety is improved by reducing cashier fatigue.

Based upon the individual shopper time constraints, inter-shopper time constraints are determined and used to enhance checkout queue selections for different shoppers. Further, the inter-shopper time constraints are integrated with the checkout-time attributes, the cashier efficiency attributes, payment-type attributes, and other attributes described herein to further dynamically adjust routing of shoppers to different POS systems.

The technology described herein further operates by computer-based processing to recognize changes in shopper sensitivity to checkout times/efficiencies and perceptions of checkout delays, such as by changes of circumstances that occur during a shopping experience. For example, while a given shopper may specify that they are willing to accept three (3) minutes for checkout completion, that same shopper may take longer to complete their shopping than expected or may believe that they have run out of time during the shopping experience (e.g., due to an unexpected delay such as running into a friend, etc.). This type of change of circumstances can cause a shopper to become more sensitive to checkout delays than previously specified. Alternatively, a given shopper may specify that they are willing to accept one (1) minute for checkout completion due to a pending appointment, only to learn while shopping that the appointment is changed to a different day. Such a change of circumstance provides the shopper with a more-leisurely shopping experience than expected upon arrival at the store. The technology described herein utilizes detection of facial expression change attributes to determine changes of circumstance. The facial expression change attributes document changes of facial expression of shoppers over time as the shoppers both shop and approach the different POS systems. By use of time sequences of facial images, the technology described herein can adjust the shopper's specified checkout time constraints.

It should be noted that shopper arrivals at a POS checkout area that includes multiple POS systems will naturally be a random process. The technology described herein further provides a balancing system that allows different shoppers to control their respective checkout time advancement or delay based upon their individual checkout time sensitivities, and further based upon any changes to their respective checkout time sensitivities. For example, where a shopper determines that they have more time to leisurely shop and checkout, that shopper may be provided with an incentive to allow another shopper that determines they have less time to shop and checkout to advance ahead of the shopper that has more time relative to the natural random ordering of shopper arrivals at the POS system area. The shopper that prefers to advance to a higher-priority position may provide the incentive to the other shopper. The incentive that is exchanged can include, for example, time during a subsequent shopping experience, or any other incentive appropriate for a given implementation. Continuing with the example of a time incentive, a shopper that gives up a position in line during one shopping experience may be automatically advanced in line position during a subsequent shopping experience. Similarly, a shopper that advances in line position during one shopping experience may be automatically moved back in line position during a subsequent shopping experience. In this way, the shoppers themselves are incentivized without any form of monetary compensation to share time with other shoppers. It is understood that shoppers would need to plan accordingly for any subsequent delay incurred as a result of accepting a time incentive during a previous shopping trip.

Queue lengths of shoppers in front of each of the distributed set of POS systems may further be utilized, again in combination with all of the other computer-generated attribute information (e.g., payment types of the queued shoppers, contents of baskets, etc.), to distribute different shoppers across the different POS systems to improve efficiency of processing of each POS system. For example, and again taking the payment type information as an example, the technology described herein operates in recognition that a natural randomized stack up of users with the same payment type (e.g., debit and/or credit card, etc.) or same type of contents of a basket may occur at a single POS system.

Using payment type as a first example, where the technology described herein determines that a given set of shoppers each are utilizing the same form of payment, such as a debit or credit card, the system automatically distributes this set of shoppers to different POS systems to avoid the randomized stack up of the same payment type at one particular POS system of the set of POS systems. The technology described herein improves efficiency of the different cashiers across a work shift by avoiding monotony of transaction processing that otherwise occurs if a cashier performs the same types of transactions repeatedly. Additionally, diversifying the payment types processed by cashiers over time allows the cashiers to remain more alert and engaged in transaction processing. As such, the technology described herein not only improves efficiency of sets of POS systems through redistribution of randomized patterns, it also improves workplace safety by maintaining alertness of cashiers and reducing cashier fatigue.

Regarding distribution of content of baskets across different POS systems, by distributing different quantities and item types across different POS systems, overall POS system efficiency is improved. As introduced above, randomized arrivals of shoppers at POS systems can result in one cashier performing the same tasks more often than other cashiers, such as handling of delicate items (e.g., a bouquet of flowers, etc.) or heavy items (e.g., soda, etc.). By distributing processing of different item quantities and item types across different cashiers, the efficiency of the different cashiers across a work shift is improved. Again, diversifying the item types processed by cashiers over time allows the cashiers to remain more alert and engaged in transaction processing. As discussed above, the technology described herein improves efficiency of sets of POS systems through redistribution of randomized patterns, and improves workplace safety by maintaining alertness of cashiers and reducing cashier fatigue.

It should be noted that conception of the present subject matter resulted from recognition of certain limitations associated with in-store point of sale (POS) technologies in retail and wholesale establishments (hereinafter "stores" for ease of reference). For example, it was observed that many stores attempt to improve overall checkout efficiency by having certain checkout lanes designated as "express" checkout lanes that have item purchase limitations (e.g., 9-item maximum, or 15-item maximum). It was determined that this form of partitioning of consumers into different sets based upon item count may disadvantage consumers with higher-volume purchases. It was further determined that this consumer disadvantage has a negative impact on repeat sales in a particular store if the higher-volume (full-service) checkout lines take too long. It was further observed that many stores have provided self-checkout lanes to reduce staff and payroll expenses. However, it was determined that self-checkout lanes have a higher potential for theft and inventory loss expenses. Further, it was observed that self-checkout lanes transfer risk of an unintentional, incorrect or non-entry of an item, from a cashier to a shopper. For example, it was observed that many shoppers are not aware of how or where to disarm anti-theft devices for their purchased items, and as a result, many shoppers attempt to exit a store with properly-purchased items that have not had the theft-prevention devices deactivated, only to have an alarm sound. It was determined that alarms being activated when shoppers have properly purchased items results in embarrassment and delays for the shopper. In view of these types of inconveniences, it was determined that shoppers over time either relegate themselves to full-service checkout lines to avoid the embarrassment and inconvenience of self-checkout lines or stop shopping at stores if the conventional checkout times take too long. In view of the several observations discussed above, it was determined that both express checkout lanes and self-checkout lanes hinder the shopping experiences of consumers and decrease store profits. It was determined that new technology was needed that obsoletes both express checkout lanes and self-checkout lanes, and that instead integrates a set of technologically-managed full-service POS systems that improve overall efficiency and shopping experiences. Based upon the technology described herein, shoppers are more enticed to shop at a particular store because the shopper may be confident of an expedited checkout, and retail sales are increased in view of the increased confidence and happiness of shoppers.

As an additional set of observations that led to conception of the technology described herein, it was observed that different consumer segments exhibit different degrees of tolerances for both time in store and technological shopping intervention of the different consumers. For example, certain consumers do not participate in loyalty programs because they do not want their purchase tracked, and coincidently pay cash. In contrast, certain other consumers prefer electronic processing of transactions and online transactions, but shop in retail establishments where they can physically evaluate the product (e.g., fresh fruits, tactile key response of a keyboard, etc.). It was observed that younger consumers want technology that allows them to expediently pay in a contactless electronic manner without delay once they make their purchasing decision(s), while older consumers, such as retired people, enjoy the shopping experience itself and have more time to enjoy a leisurely shopping experience.

Within the context of the above observations of different conventional types of POS systems and different types of consumer preferences, it was determined that conventional approaches to retail environment checkout systems were incapable of providing a seamless experience for all shoppers. The technology described herein provides a unified in-store retail transaction processing system that leverages a new form of technological processing across multiple POS lanes. Each POS lane is a full-service lane (e.g., no self-checkout lanes or express checkout lanes), and is technologically adapted by use of several different technological platforms to automate and expedite checkout for all pending consumer transactions. As such, the present subject matter improves multiple POS system efficiency, in-store shopping satisfaction, and inventory tracking and throughput by providing multiple point of sale (POS) overall wait time optimization, as described above and in more detail below. As such, improved retail store management and efficiency may be obtained through use of the present technology.

The multiple point of sale (POS) overall wait time optimization described herein may be performed in real time to allow prompt wait time reduction for multiple shoppers across multiple different POS installations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of an advanced computational platform(s) within which the present technology may be implemented, followed by further details of the multiple point of sale (POS) overall wait time optimization described herein.

It should also be noted that the present technology may be implemented within or as part of a cloud computing environment (e.g., for deep learning and data analytics), or may be implemented as a customized store-specific solution. As such, examples of implementations for both computing environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
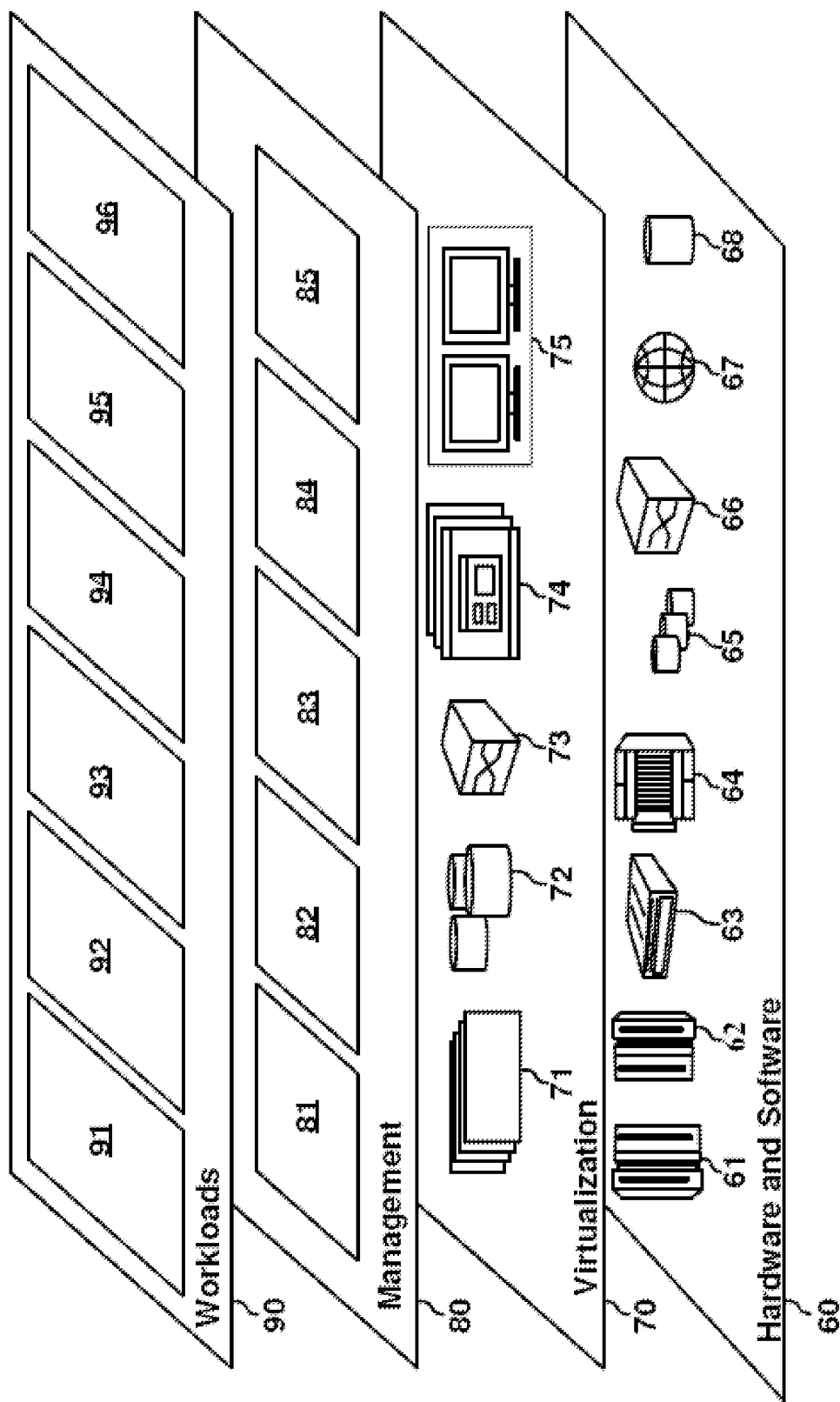
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiple point of sale (POS) overall wait time optimization 96.

Regarding alternative platform implementation options, FIGS. 3 and 4 below are directed to such alternatives. It should be understood that the various alternatives may be combined with or substituted with the implementation options described above and below, as appropriate for the given implementation.

Figure 3:
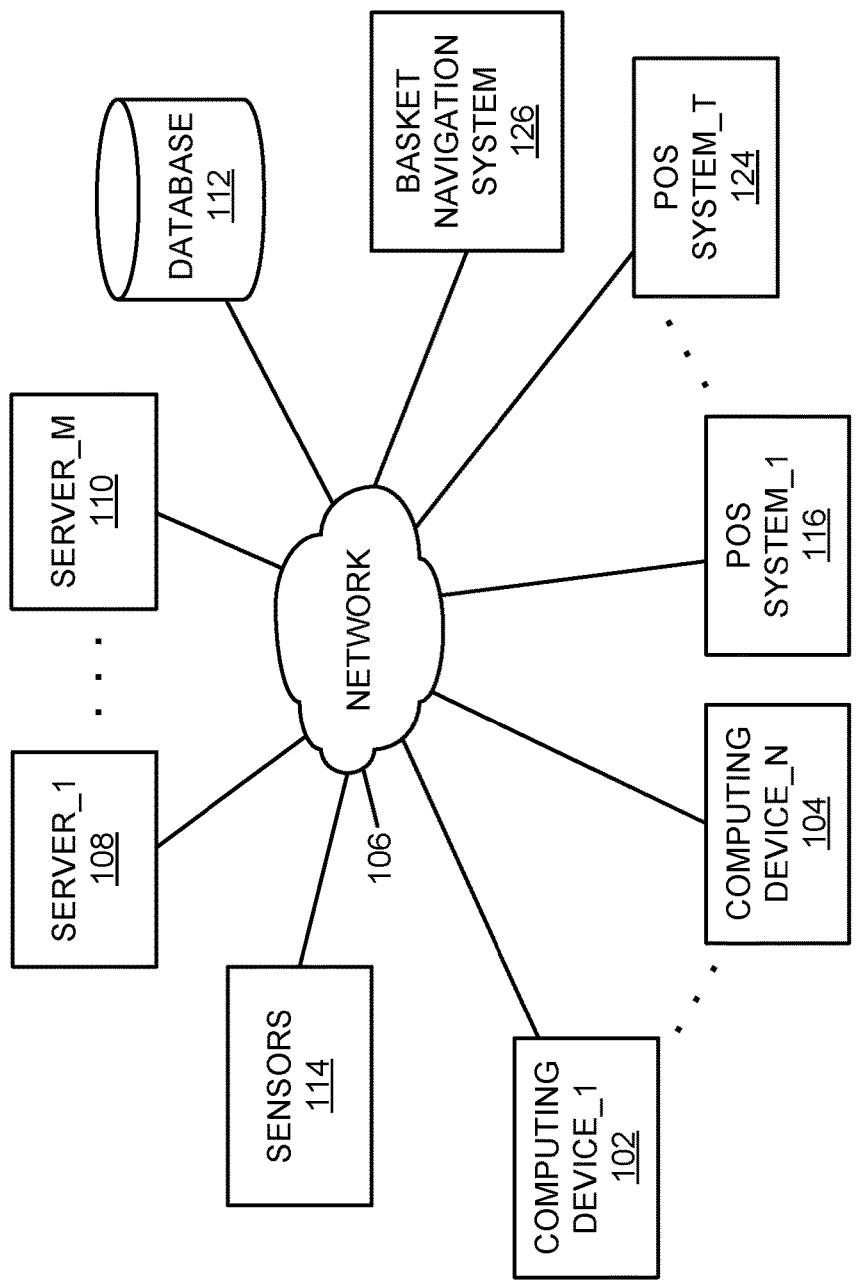
FIG. 3 is a block diagram of an example of an implementation of an in-store shopping container navigation system for multiple point of sale (POS) overall wait time optimization according to an embodiment of the present subject matter.

FIG. 3 is a block diagram of an example of an implementation of an in-store shopping container navigation system 100 (hereinafter alternatively "system 100") for multiple point of sale (POS) overall wait time optimization. A computing device_1 102 through a computing device_N 104 communicate via a network 106 with several other devices. The other devices include a server_1 108 through a server_M 110, a database 112, sensors 114, a point of sale (POS) system_1 116 through a POS system_T 124, and a basket navigation system 126.

As will be described in more detail below in association with FIG. 4 through FIG. 7, the server_1 108 through the server_M 110 each provide automated multiple point of sale (POS) overall wait time optimization. The automated multiple point of sale (POS) overall wait time optimization is based upon sensor-based analytics of items in shopping baskets, prediction of checkout times, and multiple queue prioritization across multiple POS systems. The automated multiple point of sale (POS) overall wait time optimization described herein improves computer capabilities for item recognition, improves computer capabilities for management of multiple POS systems, and improves workplace safety by distributing different types of scanning responsibilities and different payment types across different POS systems over time.

The computing device_1 102 through the computing device_N 104 represent devices that can be utilized by shoppers (e.g., cell phones, etc.) to log in to the in-store checkout system, associate a shopper with their respective shopping container before or during the shopping experience, set shopper checkout preferences and constraints, and scan items while placing items in a basket. The computing device_1 102 through the computing device_N 104 can also be mounted to the shopping baskets, and can include a touchscreen or other user-input technology that can be utilized as a terminal for shoppers to log in to the in-store checkout system to further improve the automated checkout processing described herein. In any such implementation, the computing device_1 102 through the computing device_N 104 can also be utilized to alert shoppers of suggested changes in a checkout queue and/or a checkout position as part of the processing described herein to improve overall efficiency of and safety across the multiple POS systems, and for other purposes as appropriate for a given implementation.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 includes any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 include any device capable of providing data for consumption by a device, such as the computing device_1 102 through the computing device_N 104, via a network, such as the network 106. As such, the server_1 108 through the server_M 110 may each include a web server, application server, or other data server device.

The database 112 provides storage for various kinds of information, including shopper profiles, cashier profiles, POS system efficiency data, and other information as appropriate for a given implementation. The database 112 may include a relational database, an object database, or any other storage type of device. Additionally, the database 112 can include a data warehouse, a data lake, or other device(s) capable of processing Big Data and capable of performing deep learning from unstructured data, such as the data captured from the various sensors described herein. As such, the database 112 is implemented as appropriate for a given implementation.

The sensors 114 collectively represent all of the sensors/cameras and associated systems described above. As such, the sensors 114 include direct machine-readable types of sensors, image recognition sensors, text analysis sensors, shape analysis sensors, x-ray systems, odor sensors, item density readers, packaging material recognition and characteristics sensors, weight and weight change analysis sensors, temperature measurement and thermal imaging sensors, and other sensors as appropriate for a given implementation.

A POS system_1 116 through a POS system_T 124 are illustrated. The POS systems 116-124 collectively represent multiple POS systems that are optimized as described herein. A basket navigation system 126 provides capabilities for automated navigation of shipping baskets to and reorganization/reprioritization of shopping baskets among the POS systems 116-124, as described herein. More details of automated multiple POS system processing will be described in more detail below.

Figure 4:
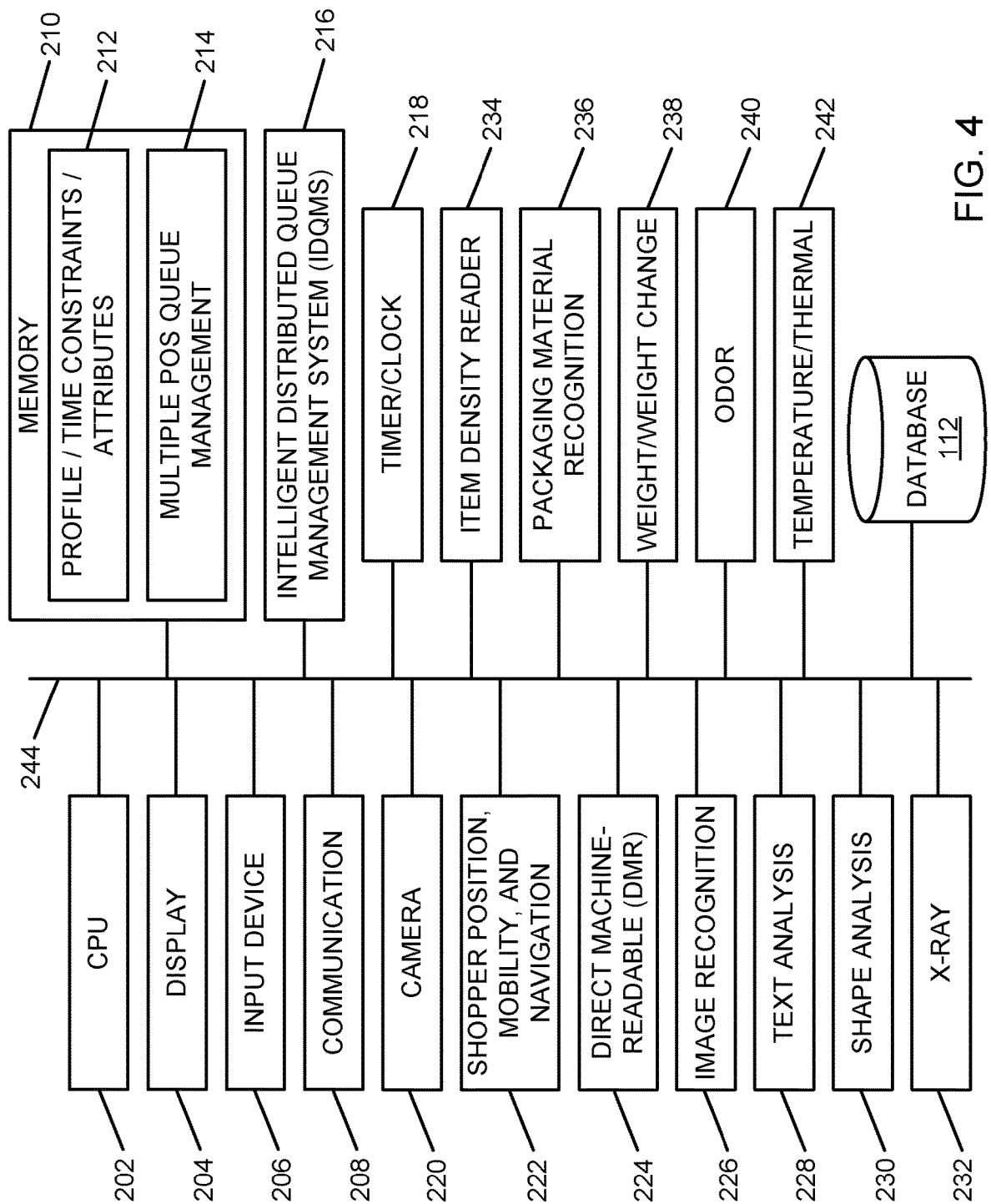
FIG. 4 is a block diagram of an example of an implementation of a core processing module capable of performing multiple point of sale (POS) overall wait time optimization according to an embodiment of the present subject matter.

FIG. 4 is a block diagram of an example of an implementation of a core processing module 200 capable of performing multiple point of sale (POS) overall wait time optimization. The core processing module 200 is understood to be associated with either the computing device_1 102 through the computing device_N 104 or with the server_1 108 through the server_M 110, or with devices within the cloud computing environment 50, with the respective components utilized as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 provides different and complementary processing of multiple point of sale (POS) overall wait time optimization in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 can include any display device, such as a cathode ray tube (CRT), liquid crystal display (LCD), light emitting diode (LED), electronic ink displays, projection, touchscreen, or other display element or panel. The input device 206 can include a computer keyboard, a keypad, a mouse, a pen, a joystick, touchscreen, voice command processing unit, or any other type of input device by which the user interacts with and responds to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100, or within the cloud computing environment 50, as appropriate for a given implementation. The communication module 208 can include any electrical, protocol, and protocol conversion capabilities useable to provide interconnection capabilities, as appropriate for a given implementation. As such, the communication module 208 represents a communication device capable of carrying out communications with other devices. The communication module 208 can further include one or more wireless communication capabilities, as appropriate for the given implementation.

A memory 210 includes a profile/time constraints/attributes storage area 212 that stores shopper profiles, cashier profiles, POS system efficiency profiles, cash profiles, shopper time constraints, inter-shopper time constraints, all of the derived sets of attributes described above (e.g., checkout-time attributes, payment type attributes, facial expression change attributes), and other forms of data usable to perform the processing performed by the core processing module 200. As will be described in more detail below, the information stored within the profile/time constraints/attributes storage area 212 is used to perform the multiple point of sale (POS) overall wait time optimization described herein.

The memory 210 also includes a multiple point of sale (POS) queue management storage area 214. The multiple POS queue management storage area 214 provides storage and processing memory for deep learning and analytics to perform the multiple point of sale (POS) overall wait time optimization described herein.

It is understood that the memory 210 can include any combination of volatile and non-volatile memory suitable for the intended purpose, distributed or localized as appropriate, and can include other memory segments not illustrated within the present example for ease of illustration purposes. For example, the memory 210 can include a code storage area, an operating system storage area, a code execution area, and a data area without departure from the scope of the present subject matter.

An intelligent distributed queue management system (IDQMS) module 216 is also illustrated. The IDQMS module 216 provides computational processing of sensor data, POS queue prioritization, and shopper distribution for the core processing module 200, as described above and in more detail below. The IDQMS module 216 implements the automated multiple point of sale (POS) overall wait time optimization described herein of the core processing module 200.

It should also be noted that the IDQMS module 216 can form a portion of other circuitry described without departure from the scope of the present subject matter. The IDQMS module 216 can form a portion of an interrupt service routine (ISR), a portion of an operating system, or a portion of an application without departure from the scope of the present subject matter. The IDQMS module 216 can also include an embedded device with circuitry designed specifically to perform the processing described herein as appropriate for a given implementation.

A timer/clock module 218 is illustrated and used to determine timing information and date information, as described above and in more detail below. As such, the IDQMS module 216 utilizes information derived from the timer/clock module 218 for information processing activities, such as POS queue processing time measurement and management associated with the multiple point of sale (POS) overall wait time optimization described herein.

Several processing modules that process readings of the various sensors/systems described above are also shown integrated into the core processing module 200. It is understood that in view of space limitations in the drawing figure, the respective sensors and processors that process sensor readings are combined for purposes of illustration, and are respectively termed modules herein for brevity.

A camera 220; a shopper position, mobility, and navigation module 222; a direct machine-readable (DMR) module 224; an image recognition module 226; a text analysis module 228; a shape analysis module 230; an x-ray module 232; an item density reader module 234; a packaging material recognition and characteristics module 236; a weight and weight change analysis module 238; an odor processing module 240; and a temperature measurement and thermal imaging module 242 provide input and processing capabilities, as each respectively described above. It is be noted that while the respective modules are illustrated as separate modules to illustrate the extensive variety of input processing performed by the technology described herein, any of the respective modules may alternatively be integrated into and form a part of the IDQMS module 216.

The database 112 is again shown within FIG. 4 associated with the core processing module 200. As such, the database 112 can be operatively coupled to the core processing module 200 without use of network connectivity, as appropriate for a given implementation.

The CPU 202, the display 204, the input device 206, the communication module 208, the memory 210, the IDQMS module 216, the respective processing modules 218-240, and the database 112 are interconnected via an interconnection 244. The interconnection 244 can include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules can include any hardware, programmed processor(s), and memory used to carry out the functions of the respective modules as described above and in more detail below. For example, the modules can include additional controller circuitry in the form of application specific integrated circuits (ASICs), processors, antennas, and/or discrete integrated circuits and components for performing communication and electrical control activities associated with the respective modules. Additionally, the modules can include interrupt-level, stack-level, and application-level modules as appropriate. Furthermore, the modules can include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/ alternatively be stored within the memory 210 without departure from the scope of the present subject matter. Accordingly, the core processing module 200 may take many forms and may be associated with many platforms.

Figure 5A:
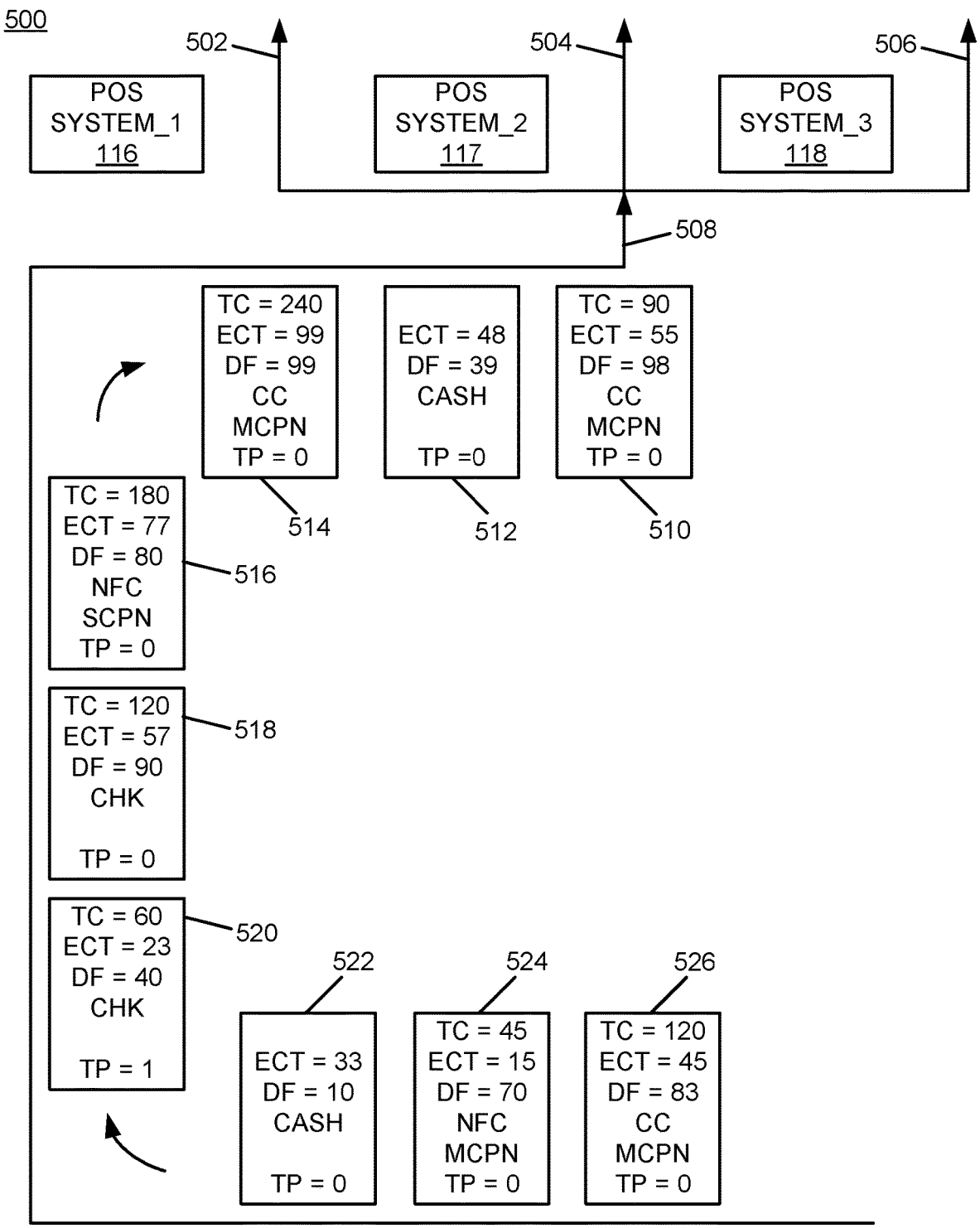
FIG. 5A illustrates an initial example time sequence of processing and control of an in-store shopping container navigation system that may be used to implement the multiple point of sale (POS) overall wait time optimization according to an embodiment of the present subject matter.
Figure 5B:
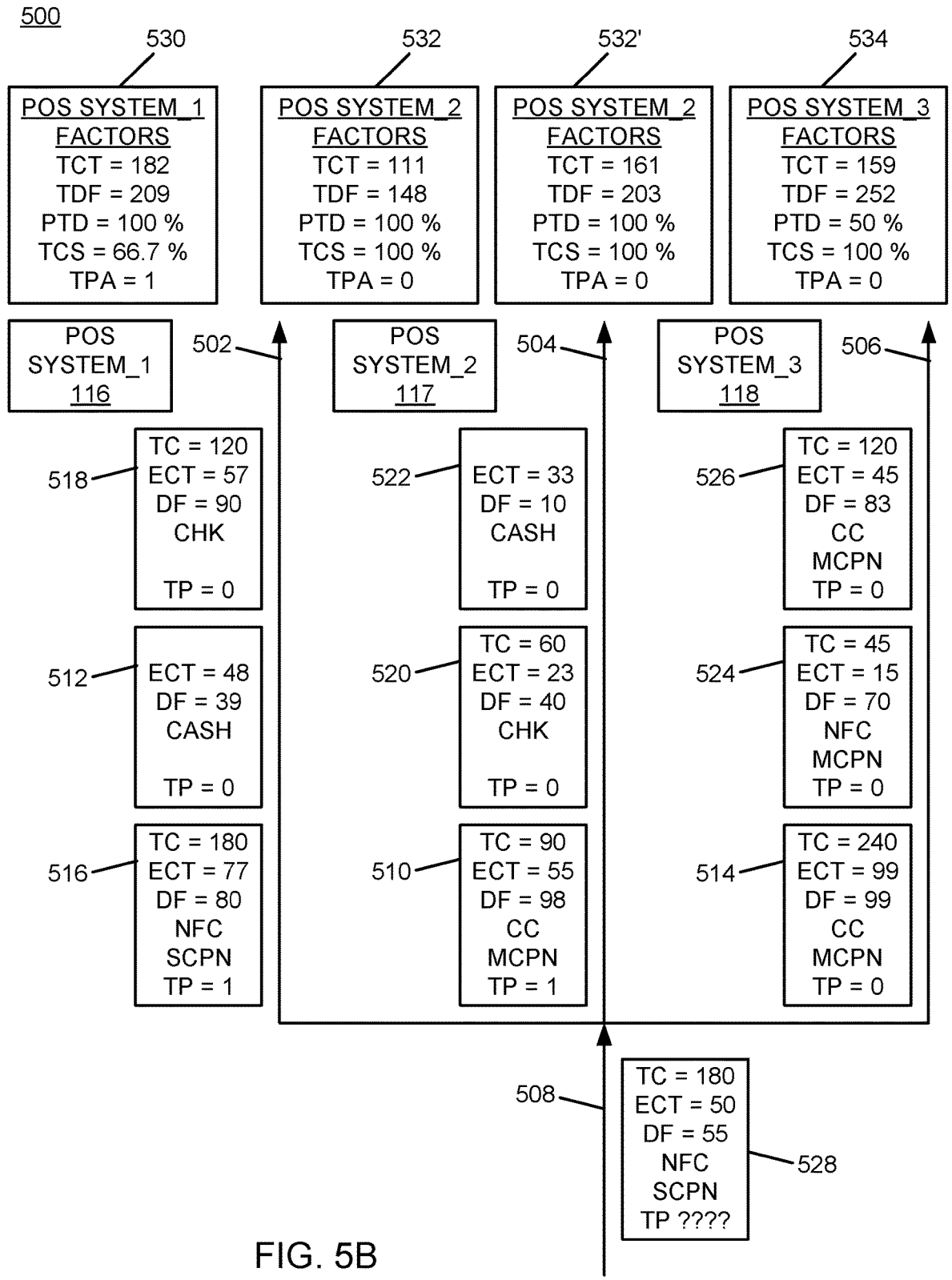
FIG. 5B illustrates a time-advanced representation of the in-store shopping container navigation system of FIG. 5A that shows a final distribution of shopping baskets across the POS systems according to an embodiment of the present subject matter.

FIGS. 5A-5B described below illustrate an example time sequence of processing and control of an in-store shopping container navigation system 500 that may be used to implement the multiple point of sale (POS) overall wait time optimization described herein. The example time sequence of processing and control is executed by devices, such as the core processing module 200, to perform the multiple point of sale (POS) overall wait time optimization associated with the present subject matter. It should be noted that the devices and elements within FIGS. 5A-5B are not drawn to any particular scale due to space constraints within the drawing sheets.

It should be noted that the technology described herein utilizes multiple POS checkout line efficiency attributes/ factors to perform the optimizations described. The multiple POS checkout line efficiency factors include: (i) actual contents of shopping containers of shoppers determined from a set of item identification sensors, (ii) difficulty factors that identify difficulty of checkout of the actual contents of the shopping containers, (iii) time constraints of individual shoppers, (iv) time sequences of images of facial expressions of the individual shoppers as they approach and wait in different queues in front of different POS systems, (v) tradeoff points of the individual shoppers, (vi) store cashier checkout performance of multiple cashiers collectively working the set of POS checkout systems with respect to how checkout performance varies individually among the multiple cashiers during a work shift, (vii) checkout efficiency of a payment type indicated by the respective shoppers, and (vii) queue length of the queues in front of the different POS systems. While it is understood that any or all of the POS checkout line efficiency factors can be utilized to improve POS system operations, certain of these efficiency factors are described in more detail than others for brevity.

Further, for purposes of the present example, the in-store shopping container navigation system 500 as described implements an automated trolley system/conveyor upon which shoppers place shopping baskets, and optimizes checkout of the respective shopping baskets by feeding the shopping baskets into different checkout queues associated respectively with different POS systems. If should further be noted that, while the description below utilizes the automated trolley system/conveyor, the respective queues that are described below may alternatively be lines of shoppers with their baskets that are directed to different POS systems. As such, the example of FIGS. 5A-5B applies to either implementation.

FIG. 5A illustrates an initial sequence of time over which several shopping baskets arrive at a set of multiple POS systems and from which POS system optimization and queue assignments are made, each as described in more detail below. As can be seen in FIG. 5A, certain of the POS systems, POS system_1 116 through POS system_T 124 that are illustrated and described in association with FIG. 3, are depicted. Specifically, the POS system_1 116, a POS system_1 117, and a POS system_3 118 are each depicted within FIG. 5A, though it should be understood that processing and queue assignments for any number of POS systems can be optimized using the technology described herein.

A POS queue 502, a POS queue 504, and a POS queue 506 are respectively associated with the POS system_1 116, the POS system_1 117, and the POS system_3 118. The POS queues 502-506 each represent a portion of the in-store shopping container navigation system 500. An in-feed queue 508 receives newly-added shopping containers/baskets as shoppers randomly arrive for checkout. The in-feed queue 508 also forms a portion of the in-store shopping container navigation system 500. As indicated above, the respective POS/in-feed queues 502-508 represent an automated trolley system/conveyor for purposes of the present example, but may alternatively be lines of shoppers, as appropriate for the given implementation.

Further, as described above, in addition to shopping basket attributes, the in-store shopping container navigation system 500 utilizes other factors to perform the optimizations described herein. For example, time sequences of images of facial expressions of the individual shoppers can be captured and evaluated as they approach and wait in different queues in front of different POS systems, and any identified changes in facial expressions can be utilized to perform reordering and/or reprioritization of the POS queues. Further, store cashier checkout performance can be tracked among multiple cashiers collectively working the set of POS checkout systems and variations in that checkout performance during a work shift can be utilized to perform the reordering and/or reprioritizations of the POS queues. Additionally, the length of the queues in front of the different POS systems can also be utilized to perform the reordering and/or reprioritization of the POS queues. For purposes of the description below, it is presumed that any reordering or reprioritization performed additionally considers facial expression image time sequences and cashier performance variations over time.

As of the initial processing within FIG. 5A, no shopping containers/baskets have been assigned to any of the POS queues 502-506. However, as can be seen in FIG. 5A, the in-feed queue 508 is filling with new arrivals of baskets of shoppers. It is presumed that the shopping baskets are placed onto the trolley system/conveyor of the in-store shopping container navigation system 500 by the shoppers, and the shoppers may wait in a waiting area for checkout to be completed. It is also presumed that the shoppers arrive randomly at the in-feed queue 508, and that the ordering of baskets within the in-feed queue 508 as depicted in FIG. 5A represents a random ordering of baskets. As will be described in more detail below, each of the baskets has different configured attributes and has a different difficulty factor (DF) associated with checkout of the basket.

To contrast the in-store shopping container navigation system 500 described herein from conventional forms of processing, it should be noted that conventional forms of POS system processing (that do not derive the benefits of the technology described herein) would result in shoppers arriving at conventional POS systems randomly by stepping into different POS checkout lines. The shoppers themselves would make choices within such a conventional POS system about which checkout line to enter, and the shoppers would have no certainty with respect to when the checkout would actually be completed. As such, this random arrival and selection would conventionally result in the shoppers/baskets being distributed randomly across different POS systems, without any guidance or optimization as described herein for the in-store shopping container navigation system 500. As described above, the technology described herein improves both overall efficiency and safety of multiple POS systems.

Returning to the description of FIG. 5A, several acronyms are utilized in view of space limitations within the drawing sheet to represent certain of the attributes described in detail above. A time constraint (TC) attribute represents a time constraint of a shopper associated with a particular shopping basket that can be part of the shopper's profile or entered by the shopper during the shopping experience. An expected checkout time (ECT) attribute is an amount of time predicted for the checkout of a basket calculated by the in-store shopping container navigation system 500 based upon the actual contents of the respective basket, as described above in detail. A difficulty factor (DF) attribute represents a measure of difficulty associated with the checkout of a particular basket that has been predicted by the in-store shopping container navigation system 500 based upon factors such as weight of items, number of items, or other factors, as described above. A payment type attribute is represented according to the particular payment instrument used by the respective shopper, and the payment type is selectable within the present example from credit card (CC), cash (CASH), check (CHK), and near field communication device (NFC), with the understanding that any type of payment instrument can be utilized as appropriate for the given implementation. A coupon type attribute is selectable from a store coupon (SCPN) and a manufacturer's coupon (MCPN), with the understanding that any form of coupon can be utilized as appropriate for a given implementation. A tradeoff point (TP) attribute represents an incentive either provided by or provided to a shopper that allows the shopper to redeem or authorize automated basket reordering and/or reprioritization, as described herein, to improve overall efficiency and safety of the multiple POS systems. It should be noted that if any element described directly above is not associated with a particular basket, then the respective area of the drawing element is omitted from the drawing of the respective basket (i.e., a blank attribute field value is represented).

Returning to the description of tradeoff points, if a shopper that allows reordering and reprioritization misses their stated/defined time constraint (TC) during any given shopping experience as a result of any reordering or reprioritization, tradeoff points (TP) are provided to the respective shopper(s) by the store. Again, the tradeoff points are provided by the store that implements the in-store shopping container navigation system 500 to compensate the shoppers for system-implemented changes to their natural random ordering of arrival in the in-feed queue 508. The in-store shopping container navigation system 500 utilizes any earned tradeoff points of any shopper(s) during subsequent shopping experiences to move the respective baskets of the shopper(s) either forward in a checkout queue or to a different checkout queue to improve checkout efficiency for the compensated shopper during that subsequent shopping experience.

Within the context of utilizing tradeoff points across different shopping experiences, it should be understood that the in-store shopping container navigation system 500 further optimizes overall POS system efficiency across multiple shopping experiences for individual shoppers to attempt to achieve a net checkout efficiency gain for each individual shopper relative to their respective time constraints. Time constraints may be different for each shopping experience according to the individual shopper's schedules.

It should additional be noted that shoppers can opt out of a tradeoff point program. Absent participation in the tradeoff point program, the in-store shopping container navigation system 500 is configured to reprioritize the POS queues for overall efficiency and safety of operations of the multiple POS systems without advancing any particular shopper that has opted out ahead of another shopper with a shorter time constraint. In this way, shoppers may be enticed to participate in a tradeoff points program.

It should additionally be noted that where shopper reprioritization is performed by the in-store shopping container navigation system 500, individual shoppers can exchange tradeoff points as an incentive to other shoppers to allow the in-store shopping container navigation system 500 to reprioritize the queues. As such, the tradeoff points may be leveraged to improve overall efficiency and safety improvements of the multiple POS systems.

Returning to the description of FIG. 5A, shopping baskets 510-526 are illustrated. Each of the respective shopping baskets 510-526 will be described through a detailed description of the shopping basket 510 and FIG. 5A itself by reference. As can be seen from FIG. 5A, the shopping basket 510 has a specified time constraint (TC) of ninety (90) seconds, has an expected checkout time (ECT) of fifty-five (55) seconds, a difficulty factor (DF) of ninety-eight (98), a payment type of credit card (CC), a manufacturer's coupon (MCPN), and no tradeoff points (TP=0).

Based upon the acronym definitions for the different attributes described above, it can be seen from FIG. 5A that each of the shopping baskets 512-526 have certain of the described attributes specified. A detailed description of the respective attributes of the respective shopping baskets 512-526 are not duplicated herein for brevity other than to further clarify certain distinct details among different shopping baskets. As described above, if an attribute is not defined, that attribute is omitted from the drawing.

As such and as can be seen within FIG. 5A, the shopping basket 512 has no time constraint (TC) specified and has no coupon specified to be used during checkout. Each of the shopping baskets 514-526 are also seen to include certain attributes, and FIG. 5A is hereby incorporated by reference as if fully set forth herein as a description of the attributes of the respective shopping carts. It can also be seen that only one shopping basket, specifically shopping basket 520, has a tradeoff point available for use (TP=1), while the other shopping baskets either have not earned tradeoff points or the respective shoppers have opted out of the tradeoff point program.

Regarding difficulty factor (DF) processing of the respective shopping baskets 510-526, it can also been seen from FIG. 5A that the first several shopping baskets 510, 514, 516, and 518 have respective difficulty factors of ninety-eight (98), ninety-nine (99), eighty (80), and ninety (90) respectively. As such, the randomized in-feed queue 508 is "front loaded" with baskets that have high difficulty factors. As described above, the technological processing described herein operates to optimize and distribute such checkout loads along with payment types across the different POS systems 116-118 to improve both overall POS system performance and workplace safety by reducing fatigue.

FIG. 5B illustrates a time-advanced representation of the in-store shopping container navigation system 500 of FIG. 5A that shows a final distribution of the shopping baskets 510-526 across the POS systems 116-118. It should be noted that because the various baskets arrived in a random order and the processing to optimize efficiency of operations across all POS systems 116-118 occurs in response to each arrival, the depicted final distribution represents the result of several intermediate changes of prioritization, ordering, and/or changes of queues of the respective baskets 510-526.

It can be seen from FIG. 5B that all of the different basket factors have been accounted for and reordered/reprioritized to optimize the operations by the set of POS systems 116-118. Three of the baskets 510-526 have been assigned to each of the POS systems 116-118 based upon the set of basket attributes described above, though it should be noted that a different assignment may result from different basket attributes specifically as they are processed according to that particular implementation.

As can be seen in FIG. 5B, the shopping baskets 518, 512, and 516 have been assigned sequentially to the POS queue 502. Similarly, the shopping baskets 522, 520, and 510 have been assigned sequentially to the POS queue 504, and the shopping baskets 526, 524, and 514 have been assigned sequentially to the POS queue 506. It can also be seen that the sequential ordering of each of the shopping baskets in each of the POS queues 502, 504, and 506 is different from the random ordering of arrival of the shopping baskets as described with reference to FIG. 5A. These differences will now be described with reference to each of the POS queues, followed by a discussion of the overall efficiency derived across all of the POS queues 502, 504, and 506 as a system.

As a preliminary matter, the shopping baskets with a higher difficulty factor (DF) have been distributed across the POS queues 502, 504, and 506. Accordingly, the in-store shopping container navigation system 500 has distributed the respective difficulty factors across the set of POS systems 116, 117, and 118, to reduce cashier fatigue and improve workplace safety. Further, the payment types have each been distributed across the POS queues 502, 504, and 506, and thus the set of POS systems 116, 117, and 118.

Specifically, the shopping basket 518 with difficulty factor (DF) of ninety (90) and the shopping basket 516 with difficulty factor (DF) of eighty (80) are each assigned to the POS queue 502. The shopping basket 510 with difficulty factor (DF) of ninety-eight (98) has been assigned to the POS queue 504. The shopping basket 526 with difficulty factor (DF) of eighty-three (83) and the shopping basket 514 with difficulty factor (DF) of ninety-nine (99) are each in the POS queue 506. As such, the respective difficulty factors assigned to the different POS systems 116-118 have been distributed, again to improve POS system efficiency and workplace safety.

Additionally, as described above, the shopping cart 520 initially had a tradeoff point (TP=1). However, in view of the reprioritization of the shopping basket 520 in view of its lower time constraint (TC=60) relative to the shopping basket 510 with a higher time constraint (TC=90), the tradeoff point has been exchanged between the shopping basket 520 (now with TP=0) and the shopping basket 510 (now with TP=1). As such, the shoppers have consented to the reprioritization of their shopping baskets and have allowed the in-store shopping container navigation system 500 to improve both overall POS system efficiency and workplace safety. It should be noted that if the time constraint of the shopping basket 510 is not satisfied by this reprioritization, the store can award an additional tradeoff point(s) to the shopper of the shopping basket 510 (i.e., TP=2) for use during a subsequent shopping experience.

Regarding POS queue optimization forecasting by the in-store shopping container navigation system 500, it should additionally be noted that an exactly equivalent distribution of difficulty factors or payment types may not be possible in practice. As such, the in-store shopping container navigation system 500 performs internal buffering of next-expected arrivals to allow placement of newly-arrived shopping baskets within different POS queues. This aspect is also observed with respect to the shopping basket 528 that is shown as a new arrival within the in-feed queue 508. As can be seen from FIG. 5B, the shopping basket 528 has a difficulty factor (DF) of fifty-five (55), and will be assigned to one of the POS queues 502-506. More details associated with assignment of the shopping basket 528 to one of the POS queues 502-506 will be described further below.

Returning to the description of FIG. 5B, as with the difficulty factor (DF) processing described above, the respective payment types and coupon usage by the shoppers have also been distributed across the different POS systems 116-118. As with the difficulty factor (DF), this form of distribution also improves POS system efficiency and workplace safety by diversifying the payment types processed by each of the respective cashiers to promote alertness, which further improves both efficiency and workplace safety. As with the difficulty factor (DF) analysis above, it should be noted that an exactly equivalent distribution of payment types and coupon usage may not be possible in practice, and the in-store shopping container navigation system 500 operates to distribute these variations in processing load over time.

Regarding time constraints of the different shopping baskets, for purposes of the present example, to reduce complexity of the present example, the expected checkout time (ECT) is presumed to equal or exceed an actual checkout time of each basket to simplify the description of the example. This actual checkout time will be utilized and described further below with respect to overall efficiency gains. It should be understood that use of actual checkout times facilitates further granularity of the computer-based processing described herein.

With reference to the POS queue 502, only two of the shopping baskets have time constraints specified. Specifically, the shopping basket 518 has a time constraint (TC) of one hundred twenty (120) seconds, the shopping basket 516 has a time constraint (TC) of one hundred eighty (180) seconds, and the shopping basket 512 does not have a time constraint (TC) specified. Similar analysis applies to the POS queue 502 and to the POS queue 506.

Regarding overall POS system efficiencies performed by the in-store shopping container navigation system 500, as can also be seen from FIG. 5B, three POS factors tables are illustrated. Specifically, a POS system_1 factors table 530, a POS system_2 factors table 532, and a POS system_3 factors table 534 are illustrated.

Within the POS_1 factors table 530, it can be seen that the total checkout time (TCT) is one hundred eighty-two (182) seconds. The total difficulty factor (TDF) is two hundred nine (209). The payment type distribution (PTD) is one hundred percent (100%), the time constraints satisfied is sixty-six percent (66%), and the tradeoff points awarded (TPA) is one (1). Similar analysis applies to each of the POS_2 factors table 532 and the POS_3 factors table 534.

Based upon the presumption stated above that the expected checkout time (ECT) equals the actual checkout time, the (TCT) of one hundred eighty-two (182) seconds indicates that the shopping basket 516 missed its time constraint for checkout (TC=180). Accordingly, this actual checkout time exceeds the time constraint (TC) of one hundred eighty (180) seconds by two (2) seconds. As a result of the shopping basket 516 missing its time constraint for checkout, the store awards one (1) tradeoff point (TP=1) to the shopping basket 516, as can be seen in FIG. 5B.

Returning to the description of the assignment of the newly-arrived shopping basket 528 to one of the POS queues 502-506, the in-store shopping container navigation system 500 evaluates all attributes of the shopping basket 528 to assign the shopping basket 528 to one of the POS queues 502-506. It can be seen that the POS factors table 532 has a lower total checkout time (TCT=111) and has a lower total difficulty factor (TDF=148) relative to the POS factors table 530 (with TCT=182, and TDF=209, respectively) and the POS factors table 534 (with TCT=159, and TDF=252, respectively). Based upon the expected checkout time and difficulty factor of the shopping basket 528, the in-store shopping container navigation system 500 assigns the shopping basket 528 to the POS queue 504.

An updated POS factors table 532 is shown as a separate instance of the POS factors table identified as POS factors table "532 prime" (532'). As can be seen from FIG. 5B, the POS factors of the POS queue 504 now show that the total checkout time and total difficulty factor have both changed (i.e., TCT=161 and TDF=203). The payment type distribution (PTD) and the time constraints satisfied (TCT) are each maintained at one hundred percent (100%), while no tradeoff points are awarded because no time constraints were missed (TPA=0). As such, by evaluating the attributes of the next arriving shopping baskets, the in-store shopping container navigation system 500 effectively reserves a queue position for the next-arriving shopping cart, and thereby effectively distributes each of the respective attributes across the respective POS systems 116-118.

As a result of the description above, the in-store shopping container navigation system 500 evaluates all attributes across all shopping baskets to optimize queuing. Based upon the accumulated operational performance information within the POS factors tables 530-534, the in-store shopping container navigation system 500 effectively distributes each of the attributes/factors to balance the time constraints of the shoppers, and to balance the difficulty of checkout processing and the different payment types across the cashiers that operate the POS systems 116-118. The in-store shopping container navigation system 500 thereby improves both shopper satisfaction and workplace safety, each as described in detail above.

Figure 7:
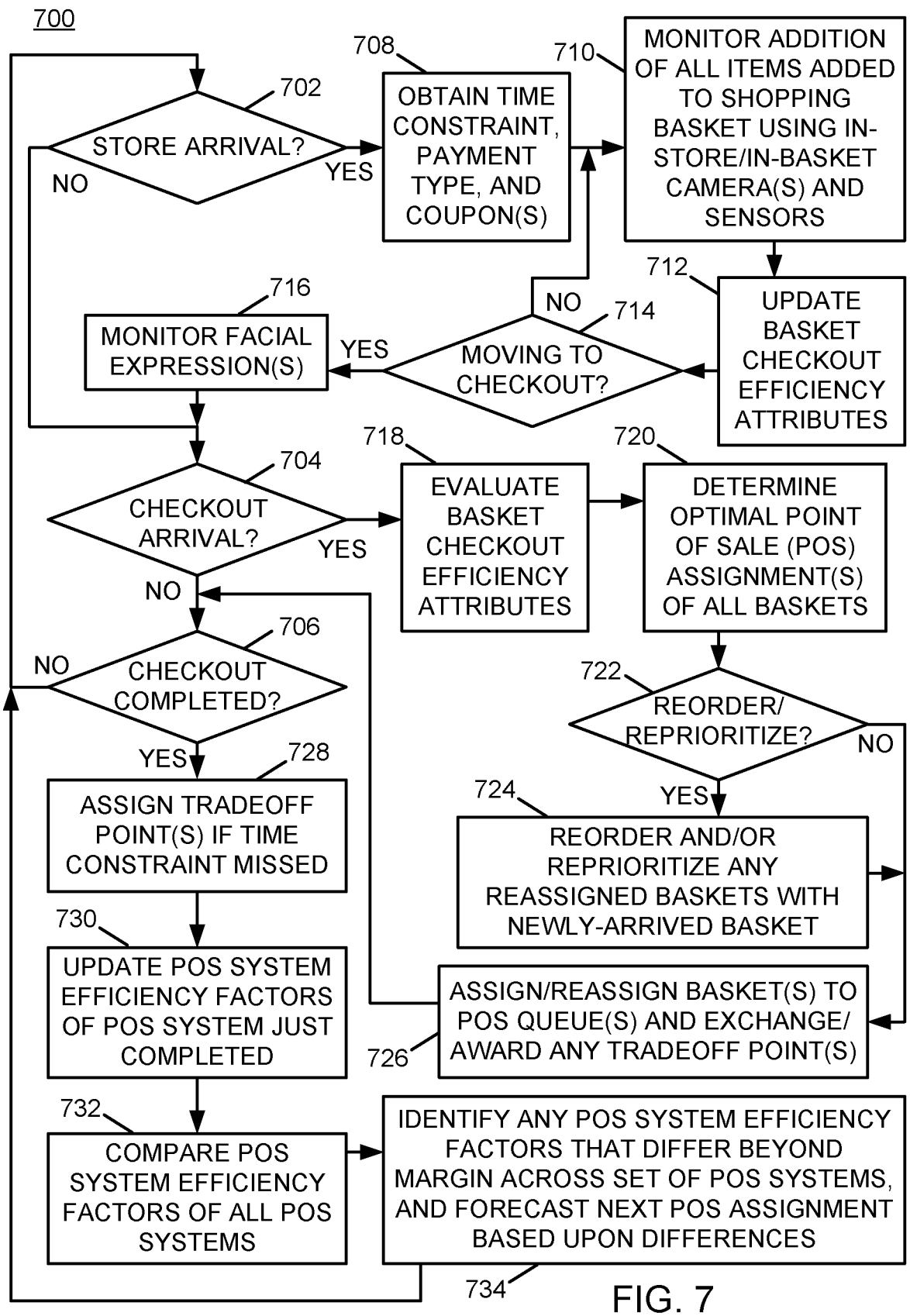
FIG. 7 is a flow chart of an example of an implementation of an alternative process for multiple point of sale (POS) overall wait time optimization according to an embodiment of the present subject matter.

FIG. 6 through FIG. 7 described below represent example processes that are executed by devices, such as the core processing module 200, to perform the multiple point of sale (POS) overall wait time optimization associated with the present subject matter. Many other variations on the example processes are possible and all are considered within the scope of the present subject matter. The example processes can be performed by modules, such as the IQDMS module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for multiple point of sale (POS) overall wait time optimization. The process 600 represents a computer-implemented method of performing the technical subject matter described herein. At block 602, the process 600 calculates iteratively, using computer-based analytics responsive to randomized individual shopper arrivals at a set of point of sale (POS) checkout systems within a store, multiple POS checkout system efficiency factors based upon: (i) actual contents of shopping containers associated with individual shoppers determined from a set of item identification sensors, (ii) difficulty factors that identify difficulty of checkout of the actual contents of the shopping containers, (iii) time constraints of the individual shoppers, (iv) time sequences of images of facial expressions of the individual shoppers as the individual shoppers approach and wait in different queues in front of the set of POS checkout systems, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of the queues in front of the set of POS checkout systems. At block 604, the process 600 identifies at least one of a change to a different queue or a change to a different position within a queue of at least one shopping container associated with an individual shopper that results in a more consistent distribution of the calculated multiple POS checkout system efficiency factors across the set of POS checkout systems. At block 606, the process 600 directs the at least one shopping container to the different queue or the different position within the queue to improve overall POS checkout system efficiency across the set of POS checkout systems.

FIG. 7 is a flow chart of an example of an implementation of an alternative process 700 for multiple point of sale (POS) overall wait time optimization. The process 700 represents a computer-implemented method of performing an alternative version of the technical subject matter described herein.

At decision point 702, the process 700 determines whether an arrival of a shopper at a store has been detected. It should be noted that the process 700 initiates processing of multiple parallel instances of the process 700 to perform different aspects of the processing responsive to arrival of each distinct shopper at the store. As such, while the process 700 is described hereinafter in a linear manner from block 702, it is understood that multiple instances of any of the processing steps described below can be invoked to perform the respective processing with respect to each such arriving shopper. Further, the multiple instances of the process 700 inter-operate to perform the analytical multiple point of sale (POS) overall wait time optimization described herein. It should be noted that the combination of the instantiated and inter-operative processes improve computer capabilities for management of multiple POS systems and improve workplace safety by improving granularity and real-time processing capabilities for gathering and processing of in-store data usable to improve overall efficiency of the multiple POS systems.

Returning to the description of decision point 702, in response to determining that an arrival of a shopper at a store has not been detected, the process 700 makes a determination at decision point 704 as to whether an arrival of a customer at a checkout in-feed queue of a set of POS systems has been detected. In response to determining at decision point 704 that an arrival of a customer at a checkout in-feed queue of a set of POS systems has not been detected, the process 700 makes a determination at decision point 706 as to whether a checkout of a shopper at one of the managed POS systems has been completed. In response to determining at decision point 706 that a checkout of a shopper at one of the managed POS systems has not been completed, the process 700 returns to decision point 702 and iterates as described above.

Returning to the description of decision point 702, in response to determining that an arrival of a shopper at a store has been detected, the process 700 obtains a time constraint, a payment type, and any coupon(s) that are planned to be used during the shopping experience from the arriving shopper at block 708. It should be noted that these attributes may be obtained either from a shopper profile or from the shopper by use of an in-store data entry module or a cell phone, as appropriate for the given implementation.

At block 710, the process 700 monitors the addition of all items to the shopping basket by the shopper using one or more in-store and/or in-basket camera(s) and sensors, as described in detail further above. At block 712, the process 700 updates basket checkout efficiency attributes (also described in detail above) responsive to each item being added to the shopping basket.

At decision point 714, the process 700 makes a determination as to whether in-store technologies (e.g., camera, etc.) have recognized that the shopper is moving toward the checkout in-feed queue. In response to determining that the shopper is not yet moving toward the checkout in-feed queue, the process 700 returns to block 710 and iterates as described above. In response to determining that the shopper is moving toward the checkout in-feed queue for multiple POS systems, the process 700 begins monitoring of facial expression(s) of the shopper at block 716. This monitoring of facial expressions may continue throughout the checkout process and until the shopper exits from the store to obtain valuable non-spoken information about the shopping experience that may be used to further improve overall POS efficiency of multiple POS system.

As described above, use of facial expressions and emotional determinations may be limited to public places where persons would not have an expectation of privacy, such as a publicly-accessible store or supermarket. Additionally, the technology described herein may implement additional protections for shoppers by providing advanced notice to shoppers entering a location being monitored. Shoppers may be provided with an ability to opt-in or opt-out of use of these features, and/or these features may be limited to shoppers that have signed up for use of these features to enhance their shopping experience. For example, shoppers may utilize their respective shopper profiles to opt-in or opt-out of use of these features.

With the shopper in-route to the checkout in-feed queue and the facial expression monitoring initiated, the process 700 returns to decision point 704 and iterates as described above. In response to determining that an arrival of a customer at a checkout in-feed queue of a set of POS systems has been detected at decision point 704, the process 700 evaluates the basket checkout efficiency attributes of the arriving shopping basket that have been collected during the shopping experience at block 718. At block 720, the process 700 determines optimal POS system assignment(s) of the basket that just arrived in combination with and based upon all baskets that are currently assigned to any of the POS queues. This processing is based upon the checkout efficiency attributes of each shopping basket that is queued to be checked out (including the shopping basket that just arrived), the POS efficiency factors that have been accumulated throughout processing of previous checkouts of shopping baskets, and analysis of facial expression(s) of the various shoppers (including the shopper associated with the newly-arrived shopping basket) that are suggestive of either contentment or apprehension regarding current POS queue assignments.

At decision point 722, the process 700 makes a determination as to whether to reorder or reprioritize any of the previous POS queue assignments. In response to determining to reorder or reprioritize any of the previous POS queue assignments, the process 700 reorders and/or reprioritizes any reassigned shopping baskets with the newly-arrived shopping basket at block 724. It should be noted that any reordering and/or reprioritization can result in exchanges of tradeoff points between the respective shoppers associated with the reordered and/or reprioritized shopping baskets, as described above. In response to reordering and/or reprioritizing any reassigned shopping baskets with the newly-arrived shopping basket at block 724, or in response to determining at decision point 722 not to reorder or reprioritize any of the previous POS queue assignments, the process 700 assigns/reassigns the shopping basket(s), including the newly-arrived shopping basket, to the selected POS queue(s) and exchanges/awards any tradeoff points at block 726. The process 700 returns to decision point 706 and iterates as described above.

Returning to the description of decision point 706, in response to determining that a checkout of a shopper at one of the managed POS systems has been completed, the process 700 assigns any tradeoff point(s) that have resulted if a specified time constraint of the shopper were missed at block 728. At block 730, the process 700 updates the POS system efficiency factors of the POS system that just completed the checkout of the shopping basket. At block 732, the process 700 compares the POS efficiency factors of all POS systems to determine any POS system that is imbalanced with respect to any of the POS system efficiency factors relative to one or more other POS systems. At block 734, the process 700 identifies any POS system efficiency factor(s) of any POS system(s) that differ beyond a configured margin across the set of POS systems, and forecasts a next POS system assignment based upon any identified differences. It should be noted that the configured margin for any particular POS system efficiency factor can be established and adjusted over time, as appropriate for any given implementation. For example, the total difficulty factor (TDF) can be configured with a margin of ten percent (10%), fifteen percent (15%), or otherwise as appropriate. Each POS system efficiency factor can be individually considered and margins established and adjusted automatically by the process 700 to further improve the real-time computer improvements provided by the process 700. In response to identifying any POS system efficiency factor(s) of any POS system(s) that differ beyond a configured margin across the set of POS systems, the process 700 returns to decision point 702 and iterates as described above.

Some embodiments of the present invention improve the technology of computers in one, or more, of the following ways: (i) computer capabilities for real-time management of and routing of shopping baskets to multiple POS systems are improved, (ii) computer capabilities for overall multi-POS system efficiency and workplace safety for both cashiers and shoppers are improved by programmatically distributing difficult checkouts, payment types, coupons, and other shopping basket attributes across different POS systems and cashiers, and (iii) computer-based analysis of shopping basket item changes during shopping are improved through computer deep learning and sensor/camera processing.

The present invention is not abstract because it relates particularly to computer operations and/or hardware for reasons that include the following: (i) combinations of in-store sensors and cameras capture information that would not be possible without the computer-based integration of various in-store technologies, (ii) processing and optimization of facial expressions and difficulty factors of various POS systems enhance both POS system efficiency across multiple POS systems and enhance workplace safety by reducing effects of fatigue on cashiers that would otherwise occur without use of the technology, and (iii) a practical application of a new form of computer-based processing is provided that leverages extensive sensor-based combinations and deep learning to improve both multi-POS system efficiency and workplace safety through use of computing technology.

As described above in association with FIG. 1 through FIG. 7, the example systems and processes provide multiple point of sale (POS) overall wait time optimization. Many other variations and additional activities associated with multiple point of sale (POS) overall wait time optimization are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method for automating a shopping container navigation system, comprising:

receiving, by the shopping container navigation system, shopping containers placed into an in-feed queue of the shopping container navigation system comprising an automated trolley system or conveyor;

calculating iteratively, by the shopping container navigation system using computer-based analytics responsive to randomized individual shopping container arrivals at a set of point of sale (POS) checkout systems of the shopping container navigation system configured to receive the shopping containers delivered by the automated trolley or conveyer, multiple POS checkout system efficiency factors based upon: (i) actual contents of shopping containers associated with individual shoppers determined from a set of item identification sensors, (ii) difficulty factors that identify difficulty of checkout of the actual contents of the shopping containers, (iii) time constraints of individual shoppers, (iv) time sequences of images of facial expressions of the individual shoppers, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of POS queues in front of the set of POS checkout systems;

distributing, by the automated trolley or conveyor of the shopping container navigation system, the shopping containers from the in-feed queue to a POS queue based upon the POS checkout system efficiency factors;

identifying at least one of a change to a different POS queue or a change to a different position within the POS queue of at least one shopping container associated with an individual shopper that results in a more consistent distribution of the calculated multiple POS checkout system efficiency factors across the set of POS checkout systems; and directing, by the shopping container navigation system, the at least one shopping container along the automated trolley or conveyor from the POS queue to the different POS queue or the different position within the POS queue to improve overall POS checkout system efficiency across the set of POS checkout systems of the shopping container navigation system.

2. The computer-implemented method of claim 1, further comprising:

capturing, using at least one camera, the time sequences of images of the facial expressions, gestures, and skin luminescence of individual shoppers associated with one or more of the shopping containers placed into the in-feed queue; and identifying any change of facial expression, gesture, or skin luminescence of any individual shopper that indicates the shopper considers the POS checkout system efficiency across the set of POS checkout systems to be less than expected by the shopper.

3. The computer-implemented method of claim 2, further comprising:

notifying the individual shopper associated with the one or more shopping containers directed by the shopping container navigation system along the automated trolley or conveyor from the POS queue to the different POS queue or the different position within the POS queue in response to detecting completion of entry of the actual contents of the shopping container by a checkout cashier for payment.

4. The computer-implemented method of claim 1, where individual item identification sensors of the set of item identification sensors are respectively attached to the shopping containers of the individual shoppers and distributed throughout the store.

5. The computer-implemented method of claim 1, where the item identification sensors comprise at least: a camera, a direct machine-readable (DMR) module, an image recognition module, a text analysis module, a shape analysis module, an x-ray module, an item density reader module, a packaging material recognition and characteristics module, a weight and weight change analysis module, an odor processing module, and a temperature measurement and thermal imaging module.

6. The computer-implemented method of claim 1, where at least the identifying of at least one of the changes to a different POS queue or a change to a different position within the POS queue based on the calculated multiple POS checkout system efficiency factors across the set of POS checkout systems is provided as a service in a cloud environment.

7. A shopping container navigation system, comprising:
an automated trolley system or conveyor;
a set of point of sale (POS) checkout systems connected to the automated trolley system or conveyor;
a memory; and
at least one processor(s) set placed in communication with the memory, the automated trolley system or conveyor and the set of POS checkout systems, said at least one processor(s) set programmed to:
receive shopping containers placed into an in-feed queue of the automated trolley system or conveyor;
calculate iteratively, within the memory using computer-based analytics responsive to randomized individual shopping container arrivals at the set of POS checkout systems via the automated trolley system or conveyor, multiple POS checkout system efficiency factors based upon: (i) actual contents of shopping containers associated with individual shoppers determined from a set of item identification sensors, (ii) difficulty factors that identify difficulty of checkout of the actual contents of the shopping containers, (iii) time constraints of the individual shoppers, (iv) time sequences of images of facial expressions of individual shoppers, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of POS queues in front of the set of POS checkout systems;
distribute via the automated trolley or conveyor, the shopping containers from the in-feed queue to a POS queue based upon the POS checkout system efficiency factors;
identify at least one of a change to a different POS queue or a change to a different position within the queue of at least one shopping container associated with an individual shopper that results in a more consistent distribution of the calculated multiple POS checkout system efficiency factors across the set of POS checkout systems; and
direct the at least one shopping container along the automated trolley or conveyor from the POS queue to the different POS queue or the different position within the POS queue to improve overall POS checkout system efficiency across the set of POS checkout systems.

8. The system of claim 7, where the at least one processor(s) set is further programmed to:
capture, using at least one camera, the time sequences of images of the facial expressions, gestures, and skin luminescence of the individual shoppers associated with one or more of the shopping containers placed into the in-feed queue; and
identify any change of facial expression, gesture, or skin luminescence of any individual shopper that indicates the shopper considers the POS checkout system efficiency across the set of POS checkout systems to be less than expected by the shopper.

9. The system of claim 7, where, in being programmed to direct the at least one shopping container to the different queue or the different position within the queue, the at least one processor(s) set is programmed to:
notify the individual shopper associated with the one or more shopping containers directed by the shopping container navigation system along the automated trolley or conveyor from the POS queue to the different POS queue or the different position within the POS queue in response to detecting completion of entry of the actual contents of the shopping container by a checkout cashier for payment.

10. The system of claim 7, where individual item identification sensors of the set of item identification sensors are respectively attached to the shopping containers of the individual shoppers and distributed throughout the store.

11. The system of claim 7, where the item identification sensors comprise at least: a camera, a direct machine-readable (DMR) module, an image recognition module, a text analysis module, a shape analysis module, an x-ray module, an item density reader module, a packaging material recognition and characteristics module, a weight and weight change analysis module, an odor processing module, and a temperature measurement and thermal imaging module.

12. The system of claim 7, where the at least one processor(s) set is programmed to identify at least one of the changes to a different POS queue or a change to a different position within the POS queue based on the calculated multiple POS checkout system efficiency factors across the set of POS checkout systems as a service in a cloud environment.

13. A computer program product for automating a shopping container navigation system, comprising:
a computer readable storage medium having computer readable program code embodied therewith, where the computer readable storage medium is not a transitory signal per se and where the computer readable program code when executed on a computer causes the computer to:
receive shopping containers placed into an in-feed queue of the shopping container navigation system comprising an automated trolley system or conveyor;
calculate iteratively, using computer-based analytics responsive to randomized individual shopping container arrivals at a set of point of sale (POS) checkout systems of the shopping container navigation system configured to receive the shopping containers delivered by the automated trolley or conveyer, multiple POS checkout system efficiency factors based upon:
(i) actual contents of shopping containers associated with individual shoppers determined from a set of item identification sensors, (ii) difficulty factors that identify difficulty of checkout of the actual contents of the shopping containers, (iii) time constraints of individual shoppers, (iv) time sequences of images of facial expressions of the individual shoppers, (v) tradeoff points of the individual shoppers, (vi) performance of multiple checkout cashiers collectively working the set of POS checkout systems as the performance varies individually among the multiple checkout cashiers during a work shift, (vii) a payment type indicated by the individual shoppers, and (vii) length of POS queues in front of the set of POS checkout systems;
identify at least one of a change to a different POS queue or a change to a different position within the POS queue of at least one shopping container associated with an individual shopper that results in a more consistent distribution of the calculated multiple POS checkout system efficiency factors across the set of POS checkout systems; and
direct the at least one shopping container along the automated trolley or conveyor from the POS queue to the different POS queue or the different position within the POS queue to improve overall POS checkout system efficiency across the set of POS checkout systems of the shopping container navigation system.

14. The computer program product of claim 13, where the computer readable program code when executed on the computer further causes the computer to:
capture, using at least one camera, the time sequences of images of the facial expressions, gestures, and skin luminescence of individual shoppers associated with one or more of the shopping containers placed into the in-feed queue; and
identify any change of facial expression, gesture, or skin luminescence of any individual shopper that indicates the shopper considers the POS checkout system efficiency across the set of POS checkout systems to be less than expected by the shopper.

15. The computer program product of claim 14, where the computer readable program code when executed on the computer further causes the computer to notify the individual shopper associated with the one or more shopping containers directed by the shopping container navigation system along the automated trolley or conveyor from the POS queue to the different POS queue or the different position within the POS queue in response to detecting completion of entry of the actual contents of the shopping container by a checkout cashier for payment.

16. The computer program product of claim 13, where individual item identification sensors of the set of item identification sensors are respectively attached to the shopping containers of the individual shoppers and distributed throughout the store.

17. The computer program product of claim 13, where the item identification sensors comprise at least: a camera, a direct machine-readable (DMR) module, an image recognition module, a text analysis module, a shape analysis module, an x-ray module, an item density reader module, a packaging material recognition and characteristics module, a weight and weight change analysis module, an odor processing module, and a temperature measurement and thermal imaging module.

18. The computer program product of claim 13, where the computer readable program code when executed on the computer causes the computer to identify at least one of the changes to a different POS queue or a change to a different position within the POS queue based on the calculated multiple POS checkout system efficiency factors across the set of POS checkout systems as a service in a cloud environment.

* * * * *